United States Patent [19]

Fukuta

[11] Patent Number: 4,789,924
[45] Date of Patent: Dec. 6, 1988

[54] MICROPROCESSOR EMULATION APPARATUS FOR DEBUGGING A MICROPROCESSOR OF AN ELECTRONIC SYSTEM WITHOUT UTILIZING AN INTERRUPT SIGNAL AND A STOP SIGNAL TO TEMPORARILY STOP AN OPERATION OF THE SYSTEM

[75] Inventor: Minoru Fukuta, Higashikurume, Japan

[73] Assignee: Iwatsu Electric Co. Ltd., Tokyo, Japan

[21] Appl. No.: 96,201

[22] Filed: Sep. 8, 1987

Related U.S. Application Data

[63] Continuation-in-part of Ser. No. 731,474, May 7, 1985, abandoned.

[30] Foreign Application Priority Data

Jul. 7, 1984 [JP] Japan .................... 59-141169

[51] Int. Cl.⁴ .............................................. G06F 11/00
[52] U.S. Cl. ........................................ 364/200; 371/16
[58] Field of Search ... 364/200 MS File, 900 MS File; 371/16–19

[56] References Cited

U.S. PATENT DOCUMENTS

| | | | |
|---|---|---|---|
| 3,925,766 | 12/1975 | Bardotti et al. | 364/200 |
| 3,937,938 | 2/1976 | Matthews | 371/17 |
| 3,967,104 | 6/1976 | Brantingham | 364/900 |
| 4,003,033 | 1/1977 | O'Keefe et al. | 364/200 |
| 4,034,194 | 7/1977 | Thomas et al. | 371/29 |
| 4,179,737 | 12/1979 | Kim | 364/200 |

Primary Examiner—David Y. Eng
Attorney, Agent, or Firm—Oblon, Fisher, Spivak, McClelland & Maier

[57] ABSTRACT

A microprocessor emulation apparatus for debugging a microprocessor of an electronic system without utilizing an interrupt signal and a stop signal to temporarily stop an operation of the system. The apparatus makes the system execute a program in the apparatus for reading and modifying contents stored in the system without using of control signals from the system by exchanging buses of the system to bus means of the apparatus to produce a pseudo stopping state, whereby the pseudo stopping state does not make the system execute a stored program of the system and which provides an analysis state which causes the system to execute the program in the apparatus.

7 Claims, 32 Drawing Sheets

| ADDRESSES<br>A A A A A A A A<br>7 6 5 4 3 2 1 0 | INSTRUCTIONS | | DATA<br>D3 D2 D1 D0 | | | |
|---|---|---|---|---|---|---|
| 0 0 0 0 0 0 0 0 | NOP | | 1 | 1 | 1 | 0 |
| 0 0 0 0 0 0 0 1 | AJMP | | 1 | 1 | 0 | 0 |
| 0 0 0 0 0 0 1 0 | LJMP | adrs | 1 | 1 | 0 | 0 |
| 0 0 0 0 0 0 1 1 | RR | A | 1 | 1 | 1 | 0 |
| 0 0 0 0 0 1 0 0 | INC | A | 1 | 1 | 1 | 0 |
| 0 0 0 0 0 1 0 1 | INC | adrs | 1 | 1 | 1 | 0 |
| - - - | - - - | | - - - | | | |

| ADDRESSES | CONTENTS of MEMORY in S.U.M. 10 |
|---|---|
| 0000 | OPERATION CODE LJMP |
| 0001 | OPERAND 01 |
| 0002 | OPERAND 23 |
| 0003 | NOP |
| ⋮ | ⋮ |
| 0123 | NOP |
| 0124 | NOP |
| ⋮ | ⋮ |

FIG. 10

| ADD-RESSES | CONTENTS in 15-1 |
|---|---|
| 0000 | MEMORY READ |
| 0100 | MEMORY WRITE |
| 0200 | REGISTER READ |
| 0300 | REGISTER WRITE |

FIG. 16

| ADD-RESSES | CONTENTS of REGISTERS in RSM 14-2 |
|---|---|
| F000 | TCON reg. |
| F001 | SCON reg. |
| F002 | IE reg. |

| ADDRESSES | CONTENTS of RSPM 14--1 |
|---|---|
| F800 | USER STOP |
| F900 | USER START |
| FA00 | MEMORY READ START |
| FB00 | MEMORY WRITE START |
| FC00 | REGISTER READ START |
| FD00 | REGISTER WRITE START |
| FE00 | CONTROL STOP |
| FFF3 | SET EA ENTRY |
| FFFB | CLEAR EA ENTRY |

| ADDRESSES | CONTENTS in MEMORY 17-6 |
|---|---|
| 00 | USER STOP |
| 10 | USER START |
| 20 | MEMORY READ STOP |
| 30 | MEMORY READ START |
| 40 | MEMORY WRITE STOP |
| 50 | MEMORY WRITE START |
| 60 | REGISTER READ STOP |
| 70 | REGISTER READ START |
| 80 | REGISTER WRITE STOP |
| 90 | REGISTER WRITE START |

FIG. 27

| ADD-RESSES | PROGRAM for USER STOP | |
|---|---|---|
| 0 0 | JBC | |
| 0 1 | EA | |
| 0 2 | adrs | (−3) |
| 0 3 | NOP | |
| 0 4 | LJMP | |
| 0 5 | adrs | (H) |
| 0 6 | adrs | (L) |
| 0 7 | NOP | |
| 0 8 | LJMP | |
| 0 9 | adrs | (H) |
| 0 A | adrs | (L) |
| 0 B | NOP | |

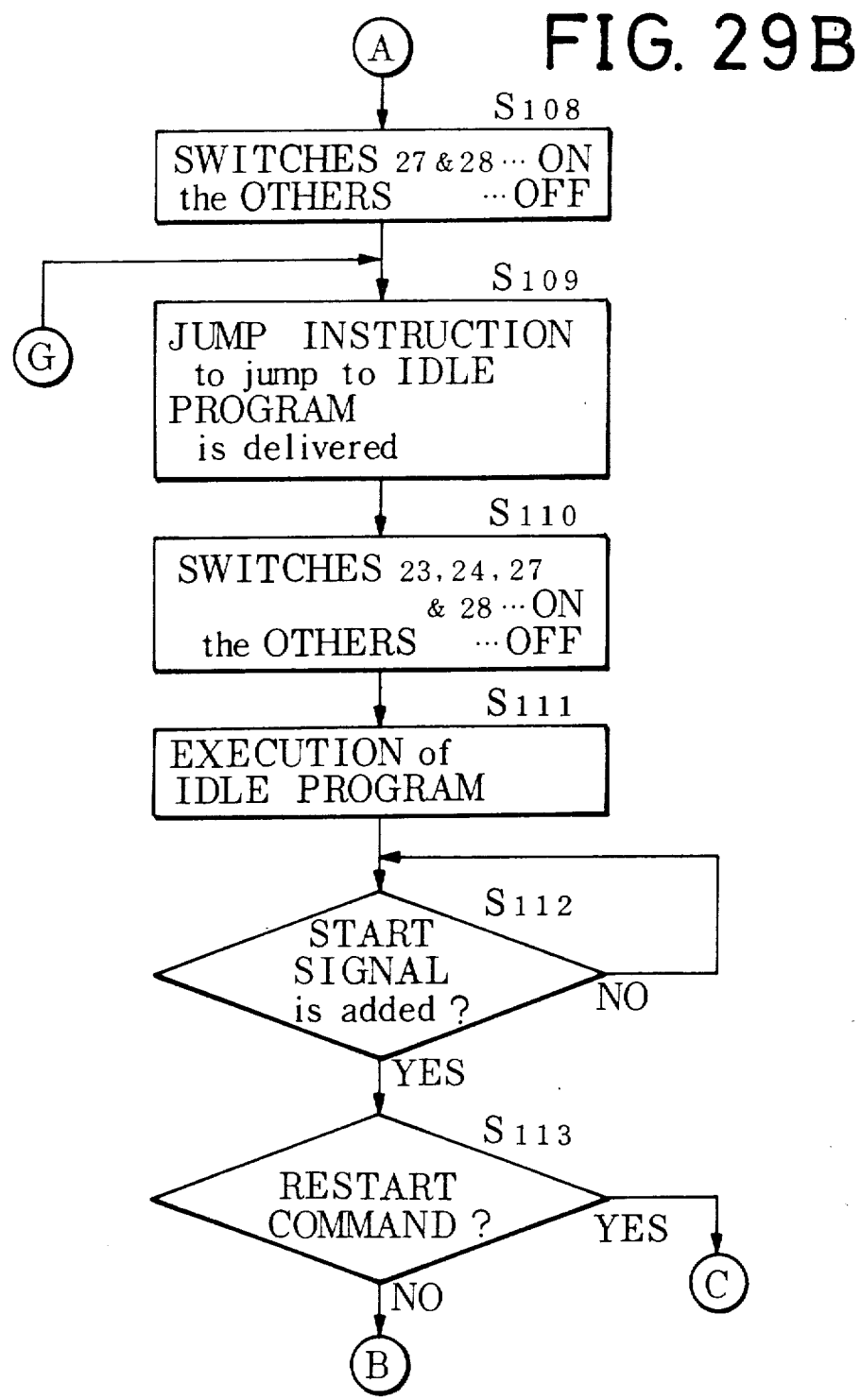

MICROPROCESSOR EMULATION APPARATUS FOR DEBUGGING A MICROPROCESSOR OF AN ELECTRONIC SYSTEM WITHOUT UTILIZING AN INTERRUPT SIGNAL AND A STOP SIGNAL TO TEMPORARILY STOP AN OPERATION OF THE SYSTEM

This application is a continuation-in-part of application Ser. No. 731,474, filed on May 7, 1985, now abandoned.

BACKGROUND OF THE INVENTION

This invention relates to an apparatus for emulating a microprocessor and particularly for debugging software and hardware of electronic instrument including a microprocessor.

There are some cases where it is needed to read out or modify stored matter contained in a memory being externally or internally equipped with the microprocessor employed in the electronic instrument for storing programs and data, and in a register thereof for temporarily storing various data. The operation of reading out and modifying are generally performed by utilizing an interrupt signal which is a kind of a control signal included in the microprocessor itself and a signal for temporally stopping the operation thereof.

To confirm that the stored matter in the memory and the register has had a predetermined value or not, in a conventional emulator, the stored matter has been read out and if it has not been the predetermined value, the stored matter has been correctively modified partially, thereafter a following program has been proceeded. Such a program as abovementioned for reading out and modifying has been involved in the emulator and has been different from a program included in the system under test.

To read out and modify as above described, in the conventional emulator, an interrupt request signal has been fed from the emulator to an interrupt terminal of the microprocessor included in the system under test. When the emulator has received a response signal of the microprocessor of the system responding to the interrupt request signal, a bus of the microprocessor employed in the system under test has been exchanged to a bus of the emulator, synchronized with the response signal. Thus, a program of the emulator for reading out and modifying has been performed in the system under test.

However, in case the program of the system under test has been programmed to inhibit any interrupt signal, the interrupt signal from the conventional emulator has not been accepted thereby. And, in case there has been no interrupt signal terminal in the microprocessor of the system under test, the interrupt request signal has not been able to be fed thereto. Therefore, the program from the conventional emulator for reading out and modifying the stored matter in the register and the memory in the system under test has not been performed.

SUMMARY OF THE INVENTION

An object of this invention is to provide a microprocessor emulation apparatus for debugging a microprocessor of an electronic instrument without utilizing an interrupt signal and a stop signal to temporarily stop an operation of a microprocessor included therein.

Another object of this invention is to provide a microprocessor emulation apparatus to make a system under test perform programs included in the apparatus for reading out and modifying without utilizing an interrupt signal, even if the system under test is unacceptable to the interrupt signal.

A further object of this invention is to provide a microprocessor emulation apparatus to make a system having a microprocessors under test perform programs for reading out and modifying included in the microprocessor emulation apparatus without using of control signals from the system by means of exchanging an address bus, data bus and control bus of the system under test to buses of the apparatus.

These and other objects, advantages, features, and uses will become more apparent as the description proceeds, when considered with the accompanying drawings.

BRIEF DESCRIPTION OF THE DRAWINGS

The principle, construction and operation of this invention will be clearly understood from the following detailed description taken in conjunction with the accompanying drawings, in which:

FIG. 4 illustrates contents of the machine cycle memory shown in FIG. 3;

FIG. 5 illustrates contents of a memory included in the system under measurement;

FIG. 10 illustrates contents in the control program memory shown in FIG. 9;

FIG. 15 illustrates contents of the return state storing program memory shown in FIG. 14;

FIG. 16 illustrates contents of the return state storing memory shown in FIG. 14;

FIG. 26 illustrates contents of the jump instruction memory shown in FIG. 24;

FIG. 27 illustrates the USER STOP program stored in the jump instruction memory;

FIGS. 29A, 29B, 29C, 29D, 29E and 29F show a flowchart of the operation of the apparatus of the invention.

DESCRIPTION OF THE PREFERRED EMBODIMENTS

Figure 1:
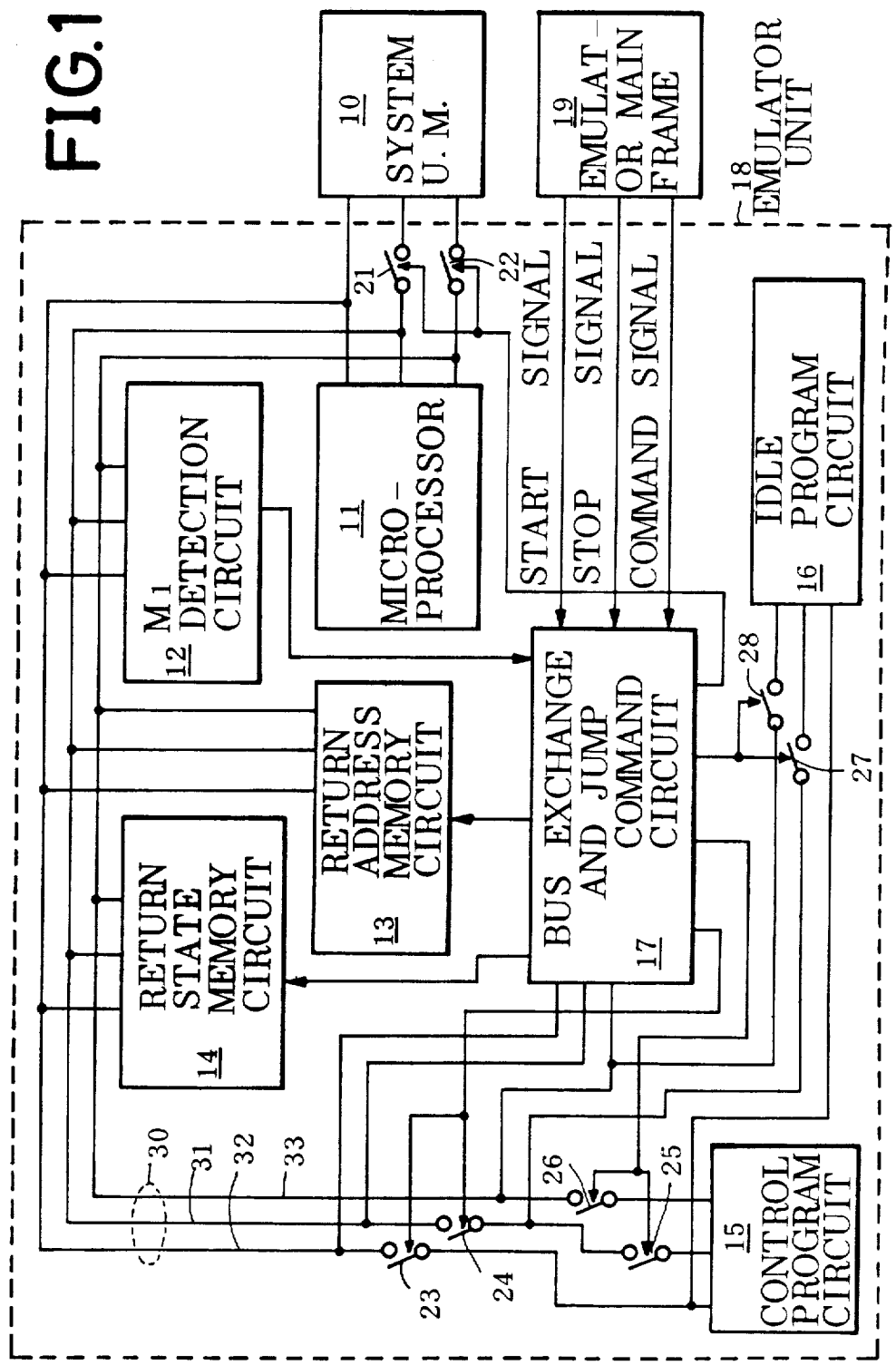
FIG. 1 is a block diagram of a microprocessor emulation apparatus in accordance with the present invention.

With reference to FIG. 1 showing an embodiment of the present invention constructed as a microprocessor emulation apparatus, reference numeral 10 indicates a system under measurement including a microprocessor and memories; 11 designates a microprocessor having registers and memories; 12 denotes a M1 detection circuit for detecting the 1st byte of a command, which for example, may consist of 3 bytes, which is a command via a bus 30 from a program memory included in the system 10 wherein the command is to be performed; 13 identifies a return address memory circuit for storing an address of the 1st bye of the command of a program being provided from the program memory included in the system 10 immediately after when a stop signal is fed to a bush exchange and jump command circuit 17 which will be described later to stop executing a program included in the system 10, and for sending out the memorized address to make the system 10 return to the address of the 1st byte of the command and execute the program provided from the program memory in the system 10; 14 represents a return state memory circuit for storing a value registered in the register included in the microprocessor 11 the instant that an output of the M1 detection circuit 12 is provided thereto, immediately after the stop signal being fed to the bus exchange and jump command circuit 17, and for sending out the stored value to the microprocessor 11 to make it return to the state of the instant of the start signal being fed thereafter; 15 shows a control program circuit for memorizing an operation analyzing program to read and modify values in the internal registers and memory and external memories of the microprocessor 11; 16 refers to an idle program circuit for storing a program to make a pseudo stopping state, in which the microprocessor 11 does not execute the program included in the system 10 and without any change being caused in the registers thereof; 17 indicates a bus exchange and jump command circuit for exchanging the bus 30, consisting of a data bus 31, an address bus 32 and a control bus 33 connected with the microprocessor 11, to the side of the system 10 or to the internal side of the apparatus, synchronizing with the output signal of the M1 circuit 12, the instant that the stop signal or the start signal is inputed thereto, and further, for generating a jump command when required by the command signal to jump to the internal program stored in the apparatus i.e. the program stored in the control program circuit 15 and the idle program circuit 16, or to the program included in the system 10; 21 to 28 show switches being operated by signals from the bus exchange and jump command circuit 17; 18 designates an emulator unit including elements of 11 to 17, 21 to 28 and 30 to 33 and characterizing the microprocessor emulation apparatus in accordance with the invention; and 19 identifies an emulator main frame (Reference: for example, Iwatsu Technical Journal Vol. 18, No. 3, page 18 to 23, 15 Jan. 1980) for sending out the stop signal, the start signal and the command signal to the emulator unit 18 and for constructing the microprocessor emulation apparatus of the invention with the emulator unit 18.

Figure 2:
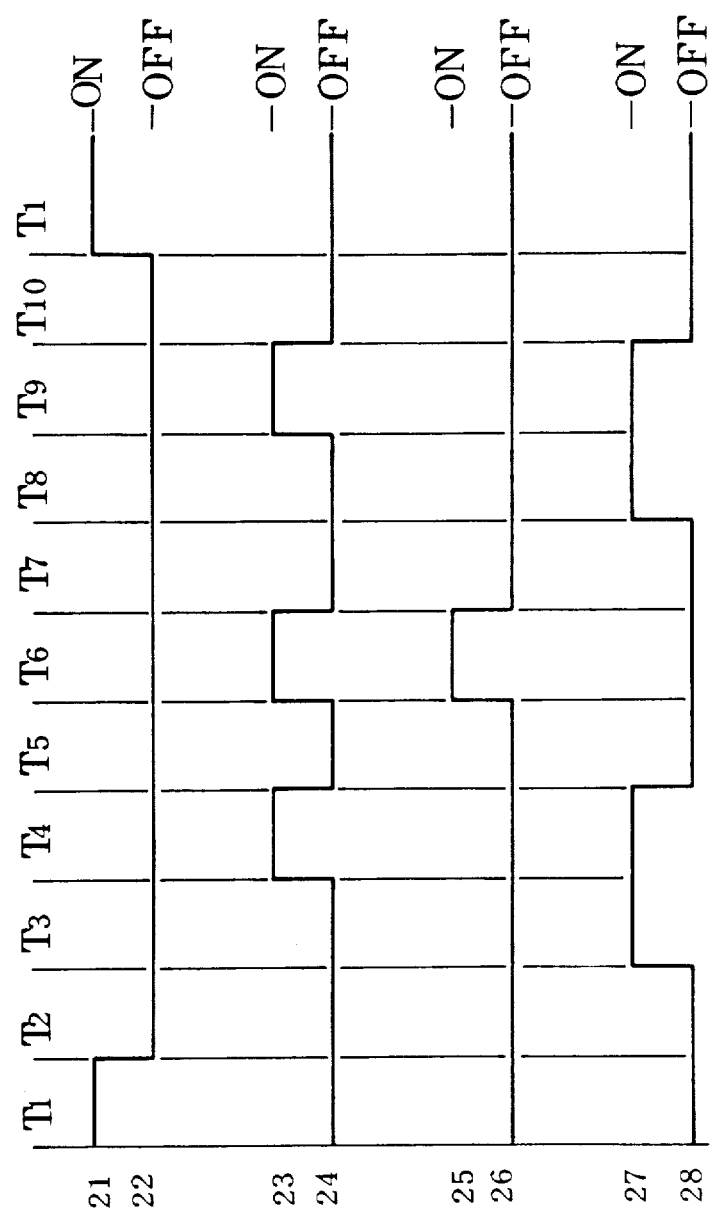
FIG. 2 is a switch state diagram of switches shown in FIG. 1.

Referring to the operational state of the invention shown in FIG. 1 and FIG. 2, after power on, the bus exchange and jump command circuit 17 switches on the switches 21 and 22 and switches off the other switches 23 to 28 to make the microprocessor 11 execute the program of the system 10 for a period $T_1$.

For the period $T_1$, the M1 detection circuit 12 always detects the 1st byte of the command, for example, consisting of 3 bytes from the program memory of the system 10 and sends the detected output to the bus exchange and jump command circuit 17.

When the stop signal is fed to the bus exchange jump command circuit 17, the circuit 17 makes the return address memory circuit 13 and the return state memory circuit 14 operate by the output signal beeing provided from the M1 detection circuit 12 immediately after the receipt of the stop signal. At the same time, the bus exchange and jump command circuit 17 makes the return address memory circuit 13 and the return state memory circuit 14 stores the address of the 1st byte of the command being provided from the program memory included in the system 10 and the value registered in the register included in the microprocessor 11 respectively the instant that the output of the M1 detection circuit 12 is provided to the circuit 17, and makes the switches 21 and 22 switch off for a period $T_2$ as shown in FIG. 2.

Thereafter, the bus exchange and jump command circuit 17 makes the switch 27 and 28 switch on for a period $T_3$, feeds out the jump command for jumping to the program stored in the idle program circuit 16 via the data bus 31, synchronizing with the output of the M1 detection circuit 12, and makes the microprocessor 11 read the jump command, for example, which consists of 3 bytes.

Thereafter, the bus exchange and jump command circuit 17 makes the switches 23 and 24 switch to the on position for the time period $T_4$ shown in FIG. 2, and causes the microprocessor 11 to be connected to the idle program circuit 16 so that the microprocessor 11 reads and executes the command stored in the idle program circuit 16, therefore there is placed in the pseudo stopping state for the time period $T_4$. In the pseudo stopping state, the program of the system 10 is not executed and no change is caused in the registers of the microprocessor 11.

Being fed the command signal for selecting a program to read or modify the matter stored in the internal registers and memories of the microprocessor 11 and the memories of the system 10, and the start signal for executing the selected program, the bus exchange and jump command circuit 17 makes the switches 23, 24, 27 and 28 switch off for the time period $T_5$ shown in FIG. 2, and causes the idle program circuit 16 to be cut off from the bus 30 and sends out the jump command for changing to the selected program of the control program circuit 15 to the microprocessor 11, via the data bus 31, synchronizing with the signal from the M1 detection circuit 12.

Thereafter, the switches 23, 24, 25 and 26 are switched on for a time period $T_6$, with the control program circuit 15 being connected to the microprocessor 11. Therefore, according to the program stored in the control program circuit 15, the data stored in the internal registers and memories of the microprocessor 11 and the memory of the system 10 may be read and modified by the jump command. The address to be jumped to in the control program circuit 15 may be indicated or changed by the command signal.

The bus exchange and jump command circuit 17 being fed the stop signal causes the switches 23, 24, 25 and 26 to be switched off for a period of time $T_7$ shown FIG. 2, after which the microprocessor 11 executes the program from the control program circuit 15 as the program is directed by the command signal.

Thereafter, the bus exchange and jump command circuit 17 causes the switches 27 and 28 to switch on for a period of time $T_8$ shown in FIG. 2, and which feeds out the jump command for jumping to the program stored in the idle program circuit 16 to the data bus 31, which is synchronized with the signal from the M1 detection circuit 12 and which further makes the microprocessor 11 read the jump command for jumping to the program stored in the idle program circuit 16.

After that, the switches 23 and 24 are being switched on for a time period $T_9$ shown in FIG. 2, the microprocessor 11 is connected from the idle program circuit 16, which then reads and executes the command stored in the idle program circuit 16, therefore causing the pseudo stopping state to be entered.

Being fed the command signal for selecting a program to read or modify the data stored in the internal resisters and memories of the microprocessor 11 and the memories of the system 10, and the start signal for executing the selected program, the bus exchange and jump command circuit 17 makes the switches 23, 24, 27 and 28 switch off for a period $T_{10}$ shown in FIG. 2, synchronizing with the signal of the M1 detection circuit 12, and sends out an op-code to the data bus 31, and makes the microprocessor 11 read the jump command for jumping to the program of the system 10. Here, the opecode is the 1st byte of the jump command, for example, consisting of 3 bytes wherein the 1st byte indicates the jump command, and the 2nd byte and the 3nd byte which are called operands showing the address that is to be jumped to.

Thereafter, the bus exchange and jump command circuit 17 reads the two operands, and transmits synchronously the state and the address to be returned to, which are respectively stored at the beginning of the time period $T_2$, in the return state memory circuit 14 and the return address memory circuit 13, to the bus 30, thereafter the switches 21 and 22 are switched on for the time period $T_1$ shown in FIG. 2. Thus, the series of the operation for emulating is ended and returned again to the state found in the time period $T_1$.

As shown in FIG. 2, there are the same states of the periods $T_7$, $T_8$ and $T_9$ as those of the periods $T_2$, $T_3$ and $T_4$. The operations of the periods $T_5$ to $T_9$ for the operation analysis and the pseudo stopping state, are repeatable any number of times if they are necessary.

In the abovementioned description, FIG. 2 shows each operation and the progress sequence of each period and does not show a duration of each period.

Each element shown in FIG. 1 is detailedly described as follows.

Figure 3:
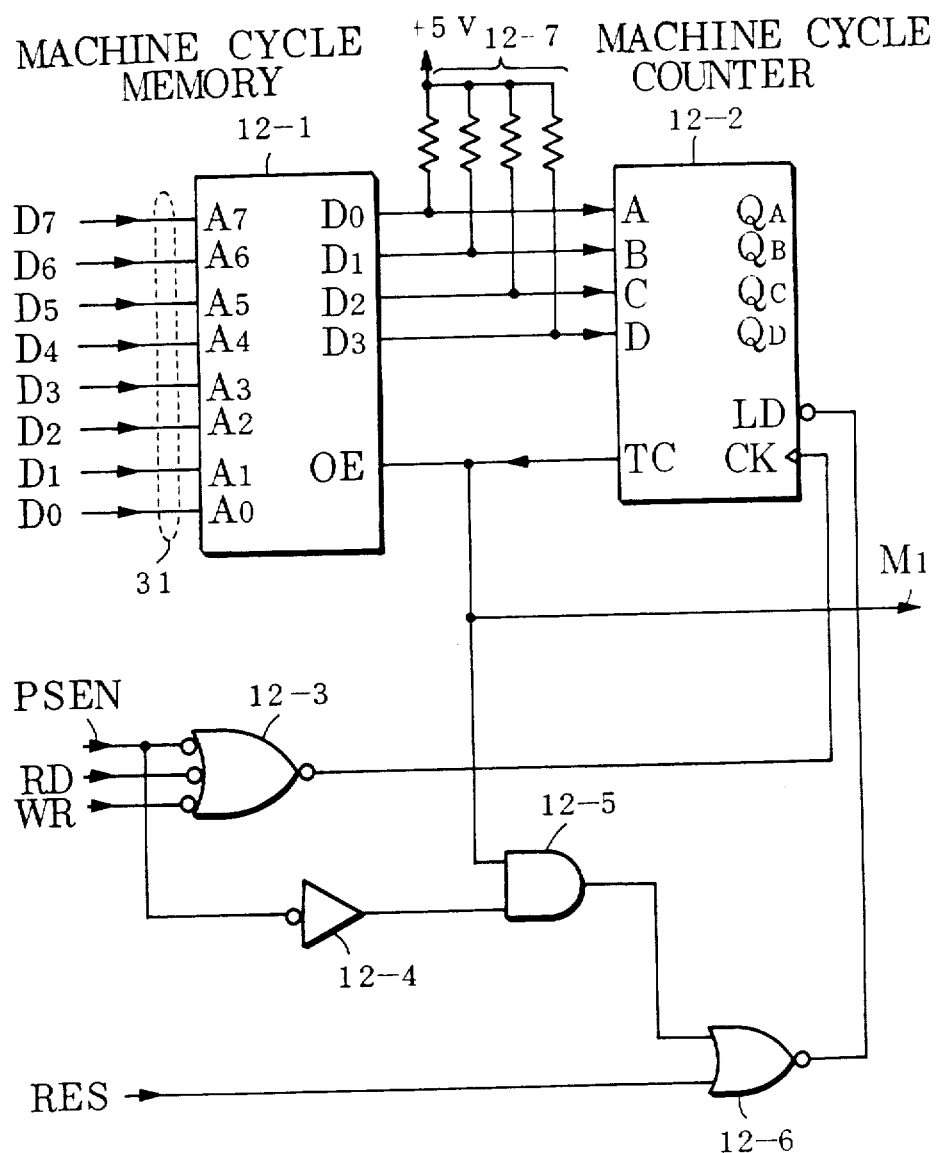
FIG. 3 is a circuit diagram of the M1 detection circuit shown in FIG. 1.

The M1 detection circuit 12 is illustrated in FIG. 3. $D_0$ to $D_7$ are signals of the data bus 31 which is connected to the microprocessor 11. PSEN (Program Store Enable) is one of control signals delivered from the microprocessor 11 which uses the PSEN signal in order to read instructions from external program memories. RD (Read Data) is another signal of control signals delivered from the microprocessor 11 which uses the RD signal in order to read data from external data memories. WR (Write) is the third signal of control signals delivered from the microprocessor 11 which uses the WR signal in order to write data into external data memories. RES is a reset signal which is delivered from the system under measurement 10 by power on in order to reset the microprocessor 11. M1 is a signal which is generated from the M1 detection circuit 12 when the circuit 12 detects the first byte in reading cycles of an instruction which is read from a program memory by the microprocessor 11.

12-1 indicates a machine cycle memory in which the number of machine cycles required to execute the instruction is stored at an address corresponding to an instruction code of the microprocessor 11.

12-2 identifies a machine cycle counter which detects the first byte of an instruction and delivers the M1 signal by counting the number of clock pulses by which the microprocessor 11 reads the instruction and executes that, wherein the first byte of the instruction shows a function of the instruction.

12-3 denotes an AND gate of three inputs to which the PSEN, RD and WR signals delivered from the microprocessor 11 through the control bus 33 are added. The AND gate 12-3 generates the clock pulses which are sent to the machine cycle counter 12-2.

12-4 and 12-5 designate respectively an inverter and an AND gate which load contents of the machine cycle memory 12-1 into the machine cycle counter 12-2 when the M1 signal is delivered from a terminal count (TC) of the machine cycle counter 12-2.

12-6 represents a NOR gate which loads "1111" into the machine cycle counter 12-2 at terminals from A to D which are connected with resistors 12-7, whereby the counter 12-2 delivers the M1 signal when the microprocessor 11 is reset.

The contents of the machine cycle memory 12-1 are illustrated in FIG. 4.

The number of the machine cycles, which are required to read and execute the instruction corresponding to the instruction code "00" (not shown) of the microprocessor 11, is stored as data of "1110" at the address "00000000". The data "1110" is 2s complement of 2, therefore "1110" added 2 makes "0000". In the instruction code "00", the microprocessor 11 reads an instruction NOP (no operation) which requires no operation. The NOP needs 2 machine cycles to be executed.

The number of the machine cycles, which are required to read and execute the instruction corresponding to the instruction code "01" (not shown) of the microprocessor 11, is stored as data of "1100" at the address "00000001". The data "1100" is 2s complement of 4, therefore "1100" added 4 makes "0000". In the instruction code "01", the microprocessor 11 reads an instruction AJMP (A jump) to jump to an address shown in 3 bits of the instruction and the next one byte. The AJMP needs 4 machine cycles to be executed.

The number of the machine cycles, which are required to read and execute the instruction corresponding to the instruction code "02" (not shown) ofo the microprocessor 11, is stored as data of "1100" at the address "00000010". The data "1100" is 2s complement of 4, therefore "1100" added 4 makes "0000". In the instruction code "02", the microprocessor 11 reads an instruction LJMP (Long Jump) to jump to an address shown in the next 2 bytes of the instruction. The LJMP needs 4 machine cycles to be executed.

The number of the machine cycles, which are required to read and execute the instruction corresponding to the instruction code "03" (not shown) of the microprocessor 11, is stored as data of "1110" at the address "00000011". The data "1110" is 2s complement of 2, therefore "1110" added 2 makes "0000". In the instruction code "03", the microprocessor 11 reads an instruction RRA to rotate contents of a resister A clockwise by 1 bit. The RRA needs 2 machine cycles to be executed.

The number of the machine cycles, which are required to read and execute the instruction corresponding to the instruction code "04" (not shown) of the microprocessor 11, is stored as data of "1110" at the address "00000100". The data "1110" is 2s complement of 2, therefore "1110" added 2 makes "0000". In the instruction code "04", the microprocessor 11 reads an instruction INCA to indicate an increment of one to contents of the register A. the INCA needs 2 machine cycles to be executed.

The number of the machine cycles, which are required to read and execute the instruction corresponding to the instruction code "05" (not shown) of the microprocessor 11, is stored as data of "1110" at the address "00000101". The data "1110" is 2s complement of 2, therefore "1110" added 2 makes "0000". In the instruction code "05", the microprocessor 11 reads an instruction INC adrs to indicate an increment of one to contents of an address of the internal memory of the microprocessor 11 which address is shown in the next one byte. The IC adrs needs 2 machine cycles to be executed.

FIG. 5 shows contents of a memory included in the system under measurement (S.U.M.) 10, wherein hexadecimal addresses are employed.

After reset (RES), the microprocessor 11 reads an operation code of LJMP instruction at an address "0000" in FIG. 5, and reads operands consisting of 2 bytes at addresses "0001" and "0002" in which "01" and "23" are respectively stored. The "0123" is the address to jump thereto. Thereafter the microprocessor 11 reads a NOP instruction at an address "0003", because the LJMP needs 4 machine cycles. Jumping to the address "0123" caused by the execution of the LJMP instruction, the microprocessor 11 reads another NOP instruction at the address "0123" and the third NOP instruction at the next address "0124", because the NOP needs 2 machine cycles to be executed.

Figure 6:
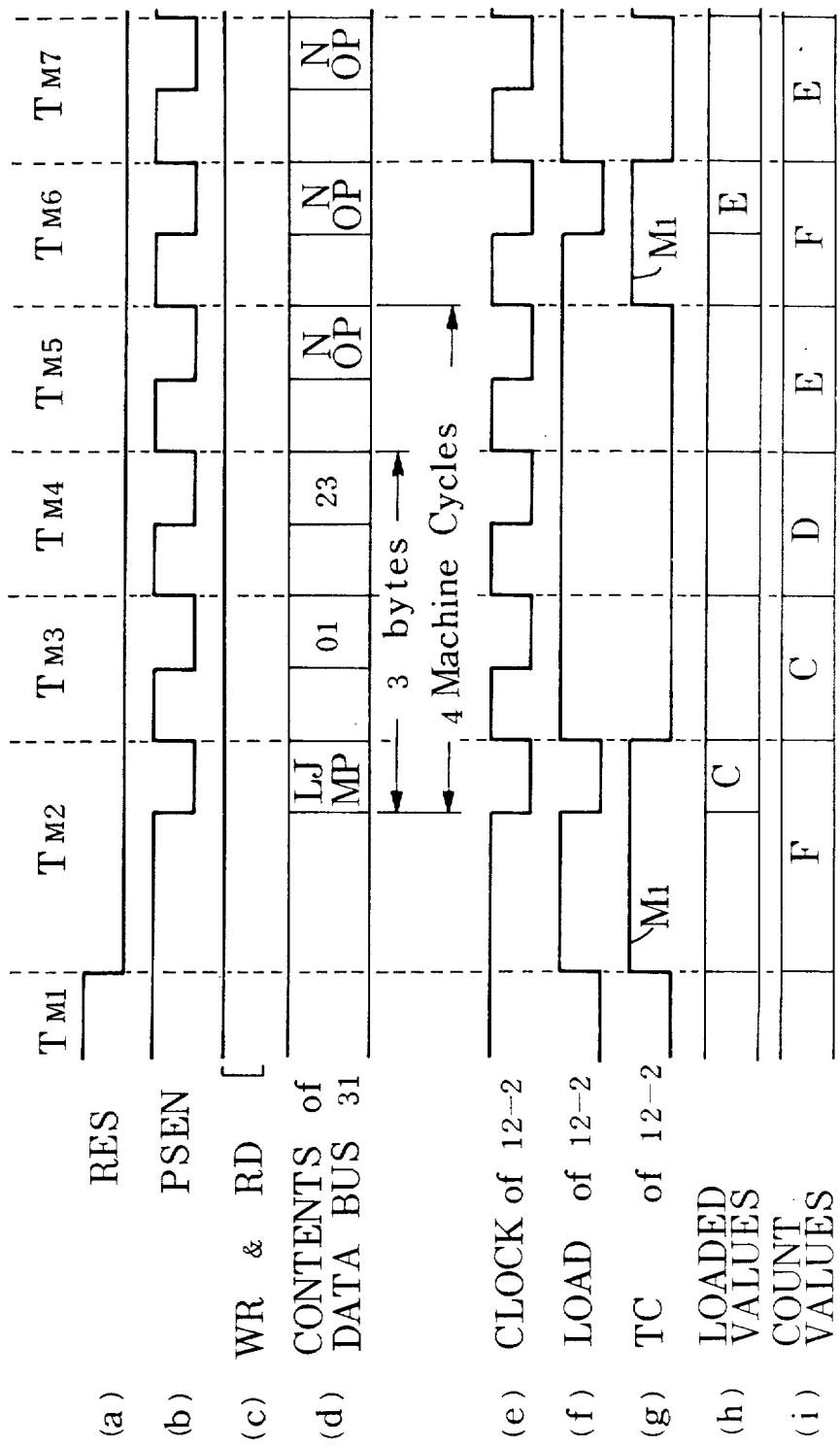
FIG. 6 is a timing chart of the M1 detection circuit.

The above-mentioned operation is illustrated in a timing chart of FIG. 6.

In a period $T_{M1}$, the microprocessor 11 is reset with a RES signal (a) being "H" which makes a load signal (f) being "L" in the output of the NOR gate 12-6 connected to the LD terminal of the machine cycle counter 12-2. A, B, C and D input teminals are connected to pullup resistors 12-7, so that the machine cycle counter 12-2 is loaded with "F" ("1111"). At the end of the period $T_{M1}$, the TC of the machine cycle counter 12-2 (g) becomes "H" which is the M1 signal.

In a period $T_{M2}$, the microprocessor 11 delivers the PSEN (program store enable) signal "L" as shown in (b) in order to read the first instruction (LJMP, FIG. 5). The TC of the machine cycle counter 12-2 shows "H" (g), so that the load signal (f) of "L" is send to the LD of the machine cycle counter 12-2 via gates 12-5 and 12-6, whereby the number of machine cycles delivered from the machine cycle memory 12-1 is loaded into the machine cycle counter 12-2 to which the machine cycle memory 12-1 sends "C" ("1100", FIG. 4) as shown in (h), because the LJMP consists of 3 bytes and needs 4 machine cycles as shown in (d). At the end of the period $T_{M2}$, the machine cycle counter 12-2 delivers the loaded value C (h) as shown in (i). The contents of the data bus 31 shows "LJMP" as shown in (d).

In a period $T_{M3}$, the microprocessor 11 delivers the PSEN signal "L" as shown in (b) in order to read the first operand at the address "0001" (FIG. 5). The count value of (i) is "C", the TC of (g) shows "L", and the load of (f) shows "H", therefore the machine cycle counter 12-2 is not loaded. The contents of the data bus 31 shows "01" as shown in (d). At the end of the period $T_{M3}$, the machine cycle counter 12-2 counts up to "D" ("1101", not shown) and deliver the count value "D" as shown in (i), synchronizing with the rising edge of the PSEN signal.

In a period $T_{M4}$, the microprocessor 11 delivers the PSEN signal "L" as shown in (b) in order to read the second operand at the address "0002" (FIG. 5). The count value of (i) is "D", the TC of (g) shows "L", and the load of (f) shows still "H", therefore the machine cycle counter 12-2 is not loaded. The contents of the data bus 31 shows "23" as shown in (d). At the end of the period $T_{M4}$, the machine cycle counter 12-2 counts up to "E" ("1110", not shown) and delivers the count value "E" as shown in (i), synchronizing with the rising edge of the PSEN signal.

In a period $T_{M5}$, the microprocessor 11 delivers the PSEN signal "L" as shown in (b) in order to read the second instruction NOP at the address "0003" (FIG. 5). The count value of (i) is "E", the TC of (g) shows "L", and the load of (f) shows still "H", therefore the machine cycle counter 12-2 is not loaded. The contents of the data bus 31 shows "NOP" as shown in (d). At the end of the period $T_{M5}$, the machine cycle counter 12-2 counts up to "F" ("1111", not shown) and delivers the count value "F" as shown in (i), synchronizing with the rising edge of the PSEN signal.

In a period $T_{M6}$, the microprocessor 11 delivers the PSEN signal "L" as shown in (b) in order to read the second instruction NOP at the address "0123" (FIG. 5) indicated in the periods $T_{M3}$ and $T_{M4}$. The count value of (i) is "F" and the TC of (g) turns to "H", therefore the M1 signal is delivered to the bus exchange and jump command circuit 17. The machine cycle counter 12-2 is loaded with "E" which is the data "1110" of the NOP in FIG. 4. The contents of the data bus 31 shows "NOP" as shown in (d). At the end of the period $T_{M6}$, the machine cycle counter 12-2 delivers "E" which is the loaded value of (h), synchronizing with the rising edge of the PSEN signal.

In a period $T_{M7}$, the microprocessor 11 delivers the PSEN signal "L" as shown in (b) in order to read the third instruction NOP at the address "0124" (FIG. 5). The count value of (i) is "E", the TC of (g) tuns to "L" and the load of (f) shows "H", therefore the machine cycle counter 12-2 is not loaded. The contents of the data bus 31 shows "NOP" as shown in (d), because the "NOP" in the period $T_{M6}$ requires two machine cycles as the data shown in FIG. 4.

In the above-mentioned periods from $T_{M1}$ to $T_{M7}$, the WR and RD signals show respectively "H" as shown in (c).

Figure 7:
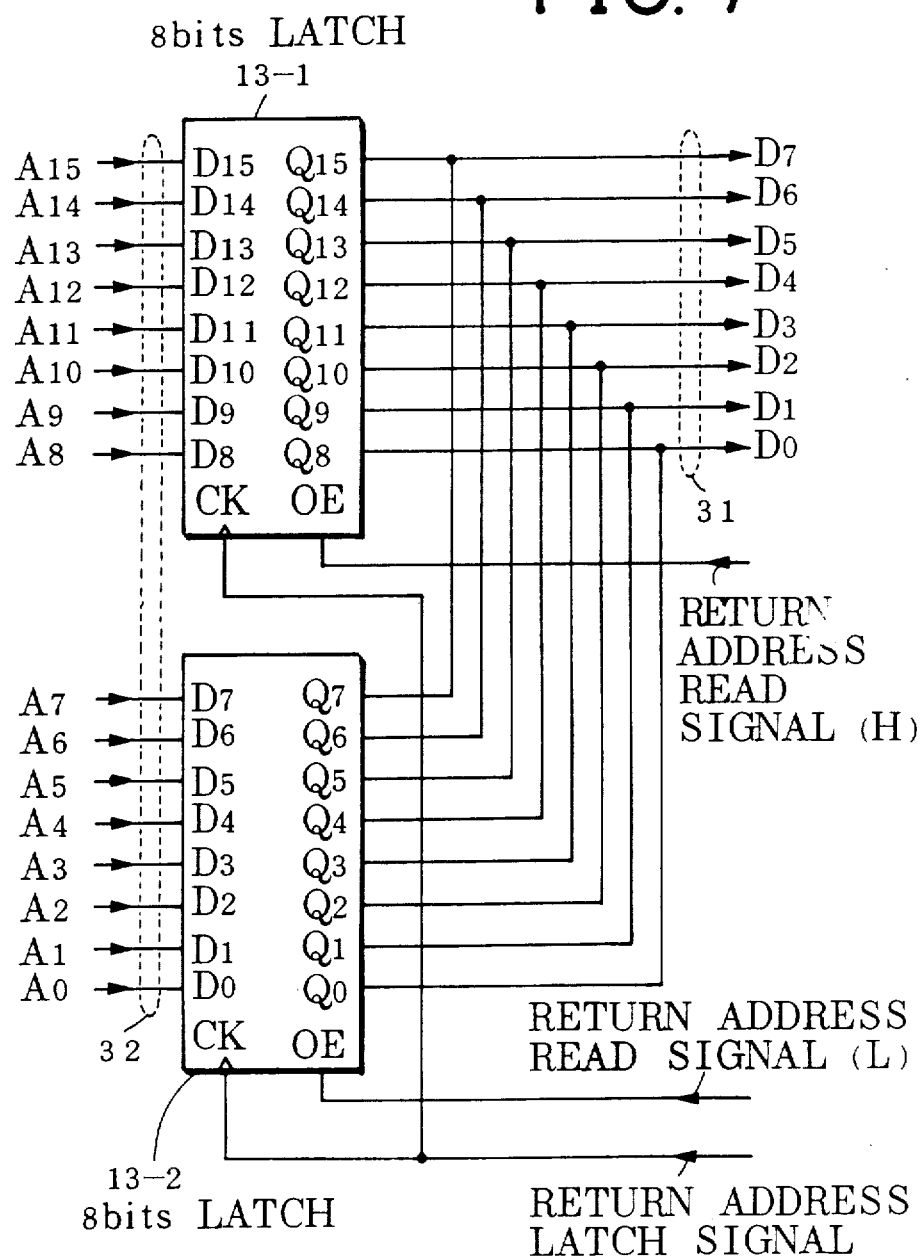
FIG. 7 is a circuit diagram of the return address memory circuit shown in FIG. 1.

FIG. 7 illustrates a circuit diagram of the return address memory circuit 13.

A0 to A15 show the address bus 32 and D0 to D7 show the data bus 31.

The address bus 32 consists of the A0 to A7 for low-order 8 bits and the A8 to A15 for high-order 8 bits. The data bus 31 consists of the D0 to D7, therefore, in reading, the low-order 8 bits and high-order 8 bits are transmitted in series, and in latching, the low-order 8 bits and high-order 8 bits are transmitted in parallel.

A return address latch signal, which is delivered from the bus exchange and jump command circuit 17, latches a return address on the address bus 32 into two 8 bits latches 13-1 and 13-2.

A return address read signal (H) for the high-order 8 bits and a return address read signal (L) for the low-order 8 bits, which signals are delivered from the bus exchange and jump command circuit 17, respectively cause both 8 bits latches 13-1 and 13-2 to send the latched data to the data bus 31.

Figure 8:
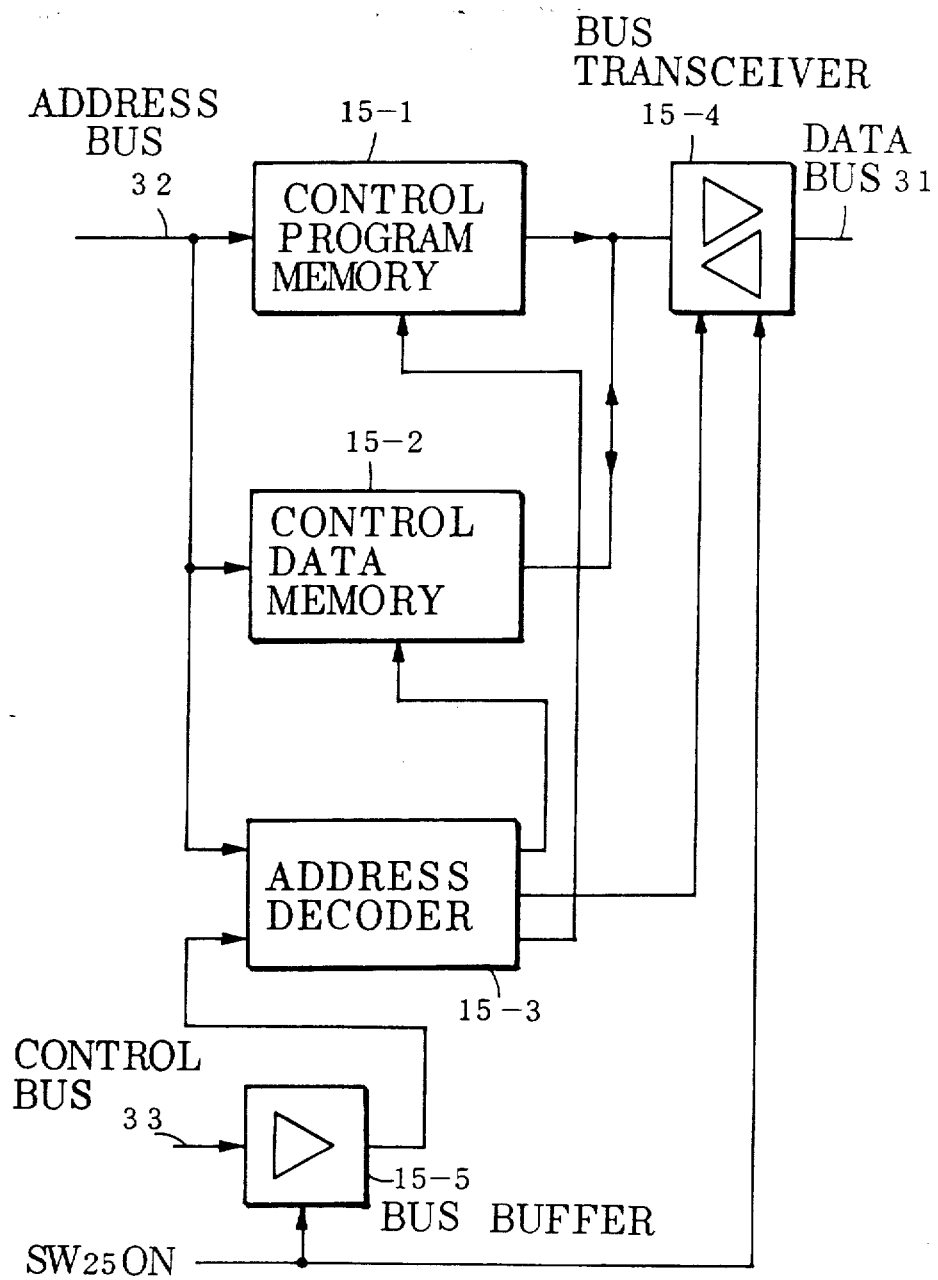
FIG. 8 is a block diagram of the control program circuit shown in FIG. 1.

FIG. 8 illustrates a block diagram of the control program circuit 15.

SW250N is a signal delivered from the bus exchange and jump command circuit 17 for causing the switches 25 and 26 (FIG. 1) to switch on.

15-1 indicates a control program memory for storing control programs to read out or write into registers or memories included in the microprocessor 11.

15-2 identifies a control data memory for storing the contents which are read from the registers or the memories.

15-3 denotes an address decoder which decodes addresses and generates enable signals and control signals to switches when inputted the SW250N signal thereto. Thereby the microprocessor 11 can access to the control program memory 15-1 and the control data memory 15-2.

15-4 designates a bus transceiver which forms the bidirectional switch 25.

15-5 represents a bus buffer which forms the switch 26.

Figure 9:
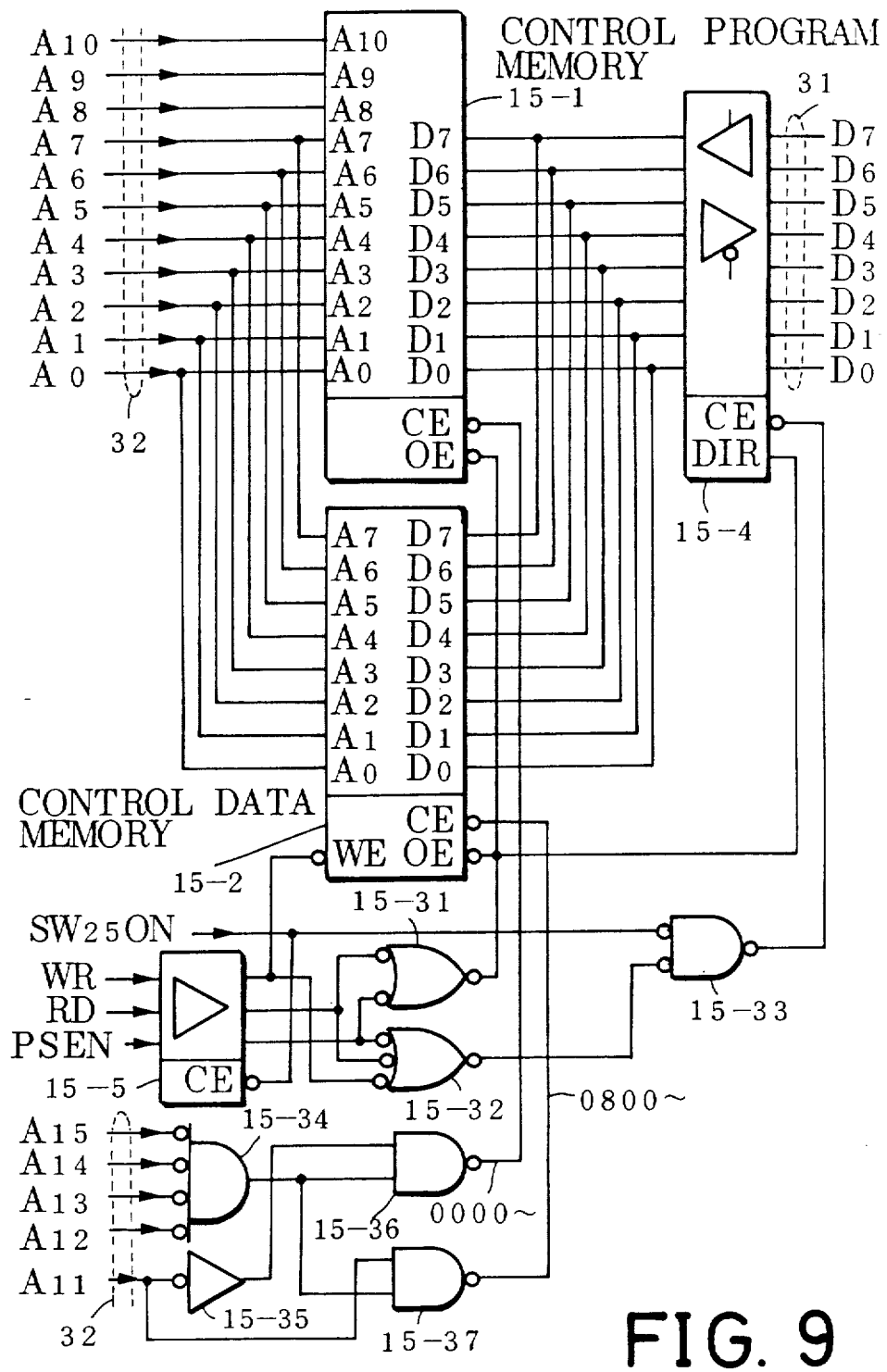
FIG. 9 is a circuit diagram of the control program circuit.

FIG. 9 illustrates a circuit diagram of the control program circuit 15.

15-1 shows the control program memory which is a ROM of 2 kilobytes.

15-2 refers to the control data memory which is a RAM of 256 bytes.

The address decoder 15-3 consists of two AND gates 15-31 and 15-32, an OR gate 15-33, a NOR gate 15-34, an inverter 15-35, and two NAND gates 15-36 and 15-37.

The AND gate 15-31 delivers an output enable signal to the control program memory 15-1 and the control data memory 15-2, when the microprocessor 11 sends out the PSEN signal or the RD signal to those memories 15-1 and 15-2 in order to read out those contents.

The AND gate 15-32 and OR gate 15-33 send out an enable signal to a chip enable terminal (CE) of the bus transceiver 15-4. The bus transceiver 15-4 are controlled with two signals from the AND gate 15-31 and the OR gate 15-33.

The NOR gate 15-34, inverter 15-35 and NAND gate 15-36 send a chip enable signal to the control program memory 15-1.

When two signals from the AND gate 15-31 and the NAND gate 15-36 are inputted, the memory 15-1 can deliver control programs stored at the addresses of from "0000" to "07FF".

The NOR gate 15-34 and NAND gate 15-37 send a chip enable signal to the control data memory 15-2. When two signals from the AND gate 15-31 and the NAND gate 15-37 inputted, the memory 15-2 can deliver control data stored at the addresses of from "0800" to "0FFF". When the WR signal via the bus buffer 15-5 and the signal from the NAND gate 15-37 are inputted, the control data memory 15-2 can store data via the bus transceiver 15-4 from the data bus 31 at addresses of from "0800" to 0FFF".

FIG. 10 shows contents in control program memory 15-1.

The control programs are used for inspecting that programs included in the system under measurement 10 can exactly be executed. Therefore, the programs of memories included in the system under measurement 10 are read out and written into the control data memory 15-2.

The programs stored in the control data memory 15-2 (user programs) are read out and loaded into registers included in the microprocessor 11 or reread out the registers and rewritten into the memories in order to obtain corrected programs.

A program of MEMORY READ is stored at the address "0000", which program is used for reading contents of memories included in the system measurement 10 and the microprocessor 11.

A program of MEMORY WRITE is stored at the address "0100", which program is used for writing into memories included in the system under measurement 10 and the microprocessor 11.

A program of REGISTER READ is stored at the address "0200", which program is used for reading contents of registers included in the microprocessor 11.

A program of REGISTER WRITE is stored at the address "0300", which program is used for writing into resisters included in the microprocessor 11.

Figure 11:
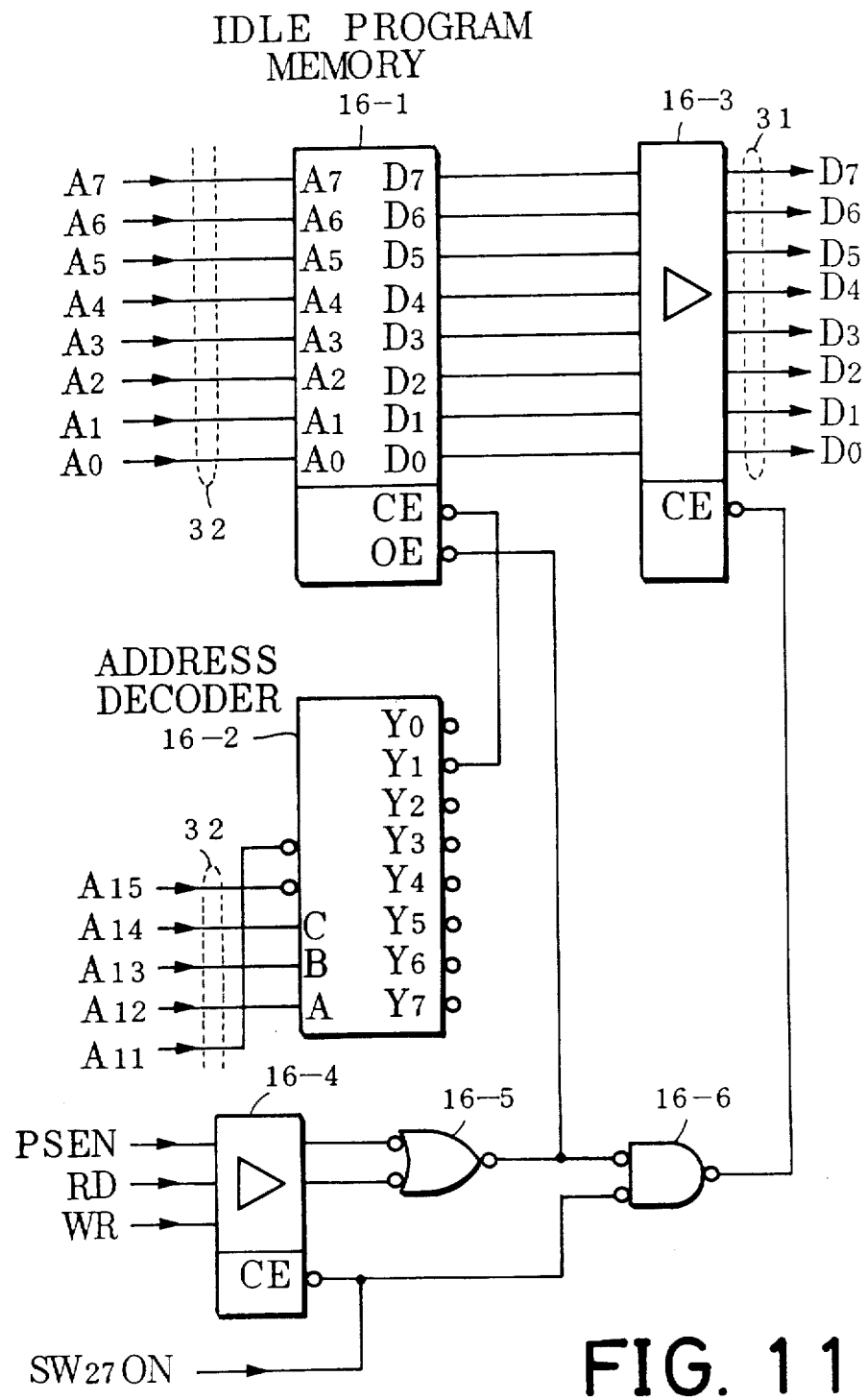
FIG. 11 is a circuit diagram of the idle program circuit shown in FIG. 1.

FIG. 11 illustrates a circuit diagram of the idle program circuit 16.

SW270N is a signal, which is delivered from the bus exchange and jump command circuit 17, for causing the switches 27 and 28 (FIG. 1) to switch on.

16-1 indicates an idle program memory for storing an idle program to make the microprocessor 11 to keep in the pseudo stopping state.

16-2 identifies an address decoder for sending a chip enable signal to the idle program memory 16-1.

16-3 denotes a bus buffer which forms the switch 27 of the idle program circuit 16.

16-4 designates a bus buffer which forms the switch 28 of the idle program circuit 16.

16-5 and 16-6 represent respectively an AND gate and an OR gate. Both gates 16-5 and 16-6 respectively delivers an output enable signal to the idle program memory 16-1 and a chip enable signal to the bus buffer 16-3, when the microprocessor 11 sends out the PSEN signal or the RD signal in order to read out the contents of the idle program memory 16-1.

When the chip enable signal from the address decoder 16-2 and the output enable signal from the AND gate 16-5 are added, the idle program memory 16-1 can deliver the idle program stored at the addresses of from "1000" to "17FF".

Figure 12:
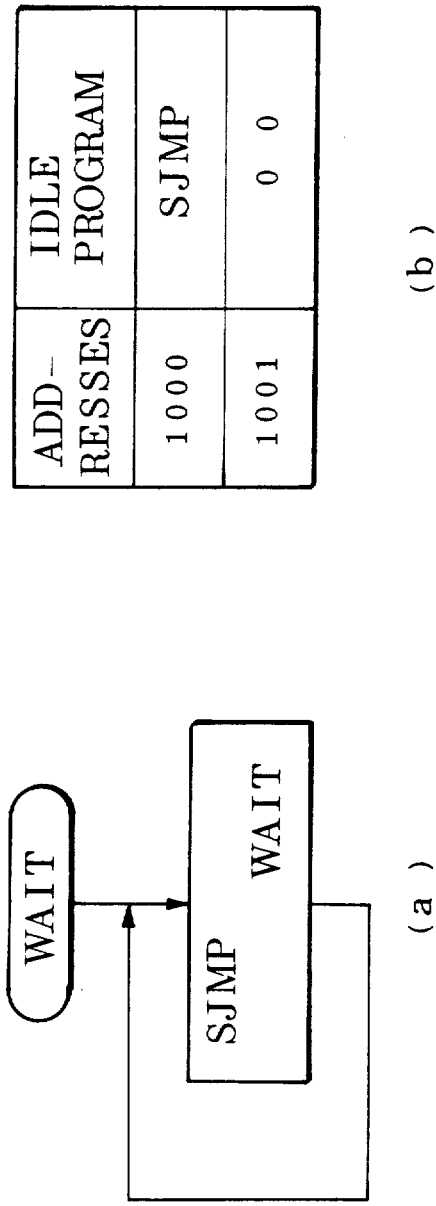
FIG. 12 illustrates a flowchart of the idle program and contents of the idle program memory shown in FIG. 11.

FIG. 12 illustrates a flowchart of the idle program in (a) and the contents of the idle program memory 16-1 in (b). The flowchart shows a simple repeat program of a wait loop. An instruction of SJMP (short jump) are stored at an address "1000". The instruction of SJMP indicates to jump to an address "00" (shown in (b)) which is shown in WAIT of the next column. The indicated address "00" means SJMP at the address "1000". Thus the wait loop is formed and the wait loop program is repeated for periods $T_4$ and $T_9$ shown in FIG. 2.

Figure 13:
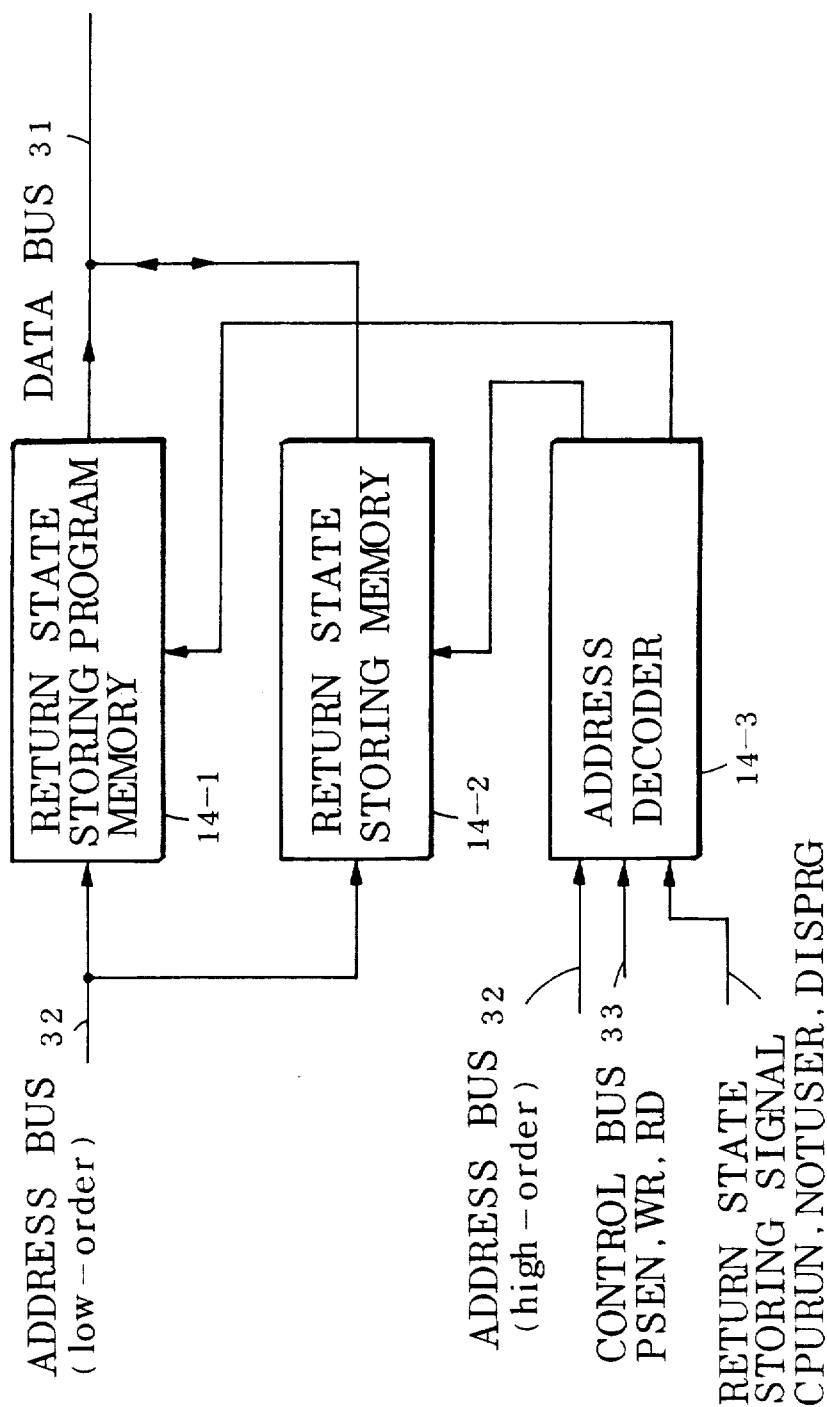
FIG. 13 is a block diagram of the return state memory circuit shown in FIG. 1.

FIG. 13 illustrates a block diagram of the return state memory circuit 14. Return state storing signals consist of CPURUN, NOTUSER and DISPRG signals which are generated from the bus exchange and jump command circuit 17.

The CPURUN signal shows a while for which the microprocessor 11 executes programs stored in the system under measurement 10 or programs stored in the control program circuit 15.

For "H" of the CPURUN signal, the programs of the system 10 or the circuit 15 are executed. For "L" of the CPURUN signal, a return state storing program or the idle program is executed by the microprocessor 11. The microprocess 11, which executes the idle program, is in the pseudo stopping state for periods $T_4$ and $T_9$ (FIG. 2.). The microprocessor 11 executes the return state storing program for periods $T_2$, $T_3$, $T_5$, $T_7$ and $T_{10}$ (FIG. 2).

The NOTUSER (not user program) signal is generated be decoding the command signal from the emulator main frame 19 which requires execution of the control programs.

The DISPRG (disable program) signal is used in order to inhibit the microprocessor 11 from reading the return state storing program while the return address memory circuit 13 delivers the return address into the data bus 31.

14-1 indicates a return state storing program memory. The memory 14-1 stores two programs. The first program is used in order to store contents of internal interrupt registers, timer registers and serial registers of the microprocessor 11 into the return state storing memory 14-2 when the execution of programs included in the system under measurement 10 is stopped. The second program, which is a return state storing program, is used in order to make the microprocessor 11 read out the contents stored in the return state storing memory 14-2, when the microprocessor 11 is instructed to reexecute the programs included in the system under measurement 10.

14-3 identifies an address decoder. Being inputted signals from the bus exchange and jump command circuit 17, the address decoder 14-3 generates enable signals for the memories 14-1 and 14-2, when the microprocessor accesses the memories 14-1 and 14-2.

Figure 14:
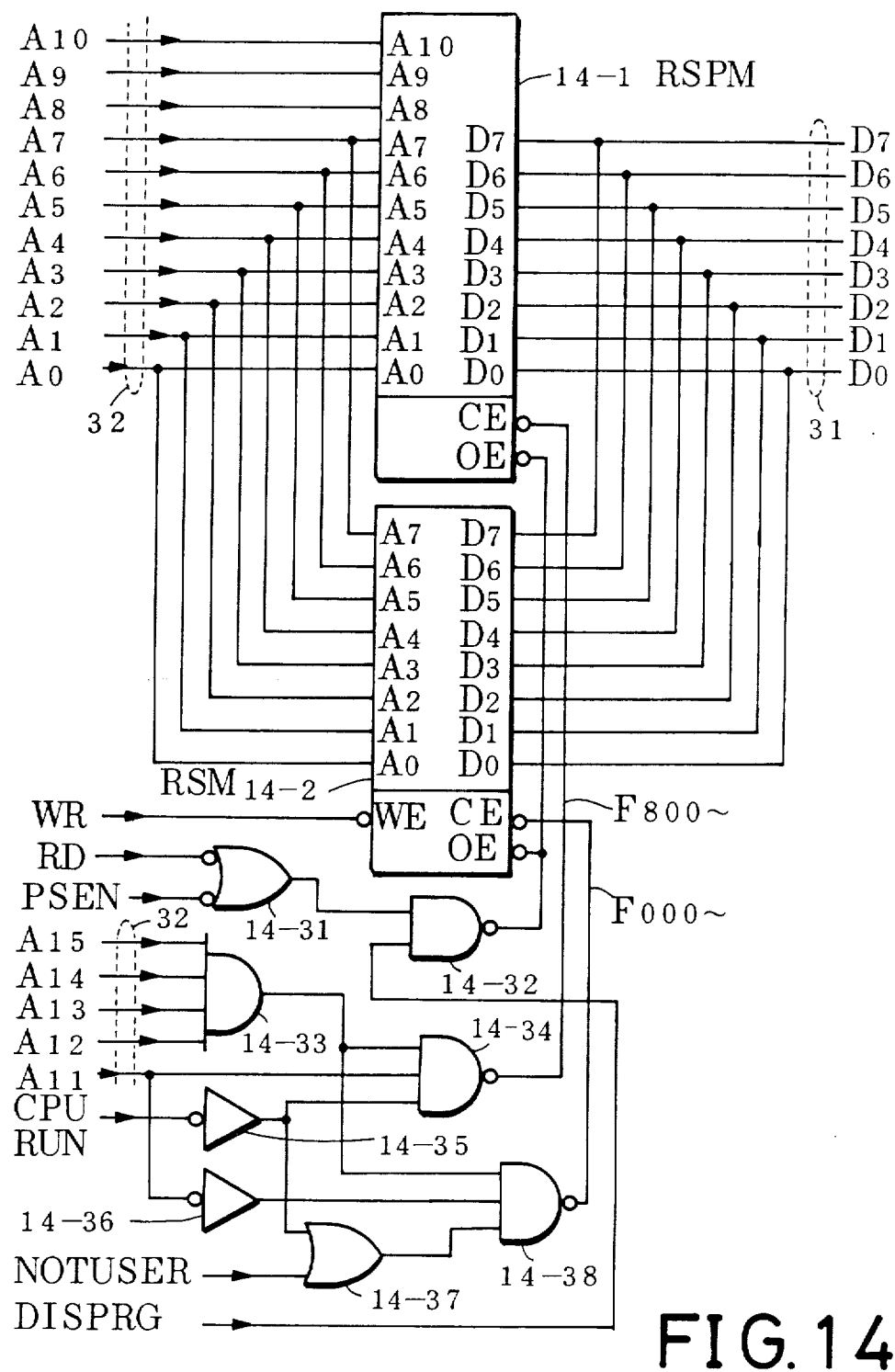
FIG. 14 is a circuit diagram of the return state storing program memory shown in FIG. 1.

FIG. 14 illustrates a circuit diagram of the return state memory circuit 14.

The return state storing program memory (RSPM) 14-1 is a ROM of 2 kilobytes.

The return state storing memory (RSM) 14-2 is a RAM of 256 bytes.

The address decoder 14-3 consists of four NAND gates 14-31, 14-32, 14-34 and 14-38, an AND gate 14-33, an OR gate 14-37, and two inverters 14-35 and 14-36.

The NAND gates 14-31 and 14-32 send out an output enable signal to the return state storing program memory 14-1 and the return state storing memory 14-2 when the PSEN or RD signal and the DISPRG signal from the bus exchange and jump command circuit 17 are inputted thereto.

The AND gate 14-33, NAND gate 14-34 and inverter 14-35 send out a chip enable signal to the return state storing program memory 14-1.

The inverter 14-36, OR gate 14-37 and NAND gate 14-38 send out a chip enable signal to the return state storing memory 14-2.

When the output enable signal from the NAND gate 14-32 and the chip enable signal from the NAND gate 14-34 are inputted, the return state storing program memory 14-1 can be read at the addreses of from "F800" to "FFFF" by the microprocessor 11.

When the output enable signal from the NAND gate 14-32 and the chip enable signal from the NAND gate 14-38 are inputted, the return state storing memory 14-2 can be read at the addresses of from "F000" to "F7FF" be the microprocessor 11.

FIG. 15 illustrates contents of the return state storing program memory (RSPM) 14-1.

A program of USER STOP (user program stop) is stored at the addresses of from "F800" to "F8FF", which program is used for stopping execution of the program included in the system under measurement 10. Executing the program, the microprocessor 11 can read out contents of the interrupt register, timer register and serial register included therein and write into the return state storing memory 14-2.

A program of USER START (user program start) is stored at the address of from "F900" to "F9FF", which program is used in order to rewrite the contents stored in the return state storing memory 14-2 by the execution of the USER STOP program into the interrupt register, timer register and serial register included in the microprocessor 11.

A program of MEMORY READ START (memory erad program start) is stored at the address of from "FA00" to "FAFF", which program is used for starting execution of program of MEMORY READ (FIG. 10).

A program of MEMORY WRITE START (memory write program start) is stored at the address of from "FB00" to "FBFF", which program is used for starting execution of the program of MEMORY WRITE (FIG. 10).

A program of MEMORY WRITE START (register write program start) is stored at the address of from "FD00" to "FDFF", which program is used for starting execution of program of REGISTER WRITE (FIG. 10).

A program of CONTROL STOP (control program stop) is stored at the address of from "FE00" to "FEFF", which program is used for stopping execution of the control program shown in FIG. 10 and starting execution of the idle program shown in FIG. 12.

A program of SET EA ENTRY is stored at the address of from "FFF3" to "FFFA", which program is used at the end of the execution of the USER START program and at just before the reexecution of the user programs in the microprocessor 11 in order to rewrite EA bit to "1" in an IE register included in the microprocessor 11. When the EA bit shows "1", the microprocessor 11 is enabled to allow all interruptions, and when the EA bit shows "0", the microprocessor 11 is disabled to allow all interruption.

A program CLEAR EA ENTRY is stored at the address of from "FFFB" to "FFFF", which program is used for rewriting the EA bit to "0".

Addresses shown in FIG. 15 are indicated with the hexidecimal notation.

FIG. 16 illustrates the memory location of contents stored in the return state storing memory 14-2.

A timer/counter control register (TCON reg.), a serial control register (SCON reg.) and an interrupt enable register (IE reg.) are included in the microprocessor 11. Contents of the TCON reg., SCON reg. and IE reg. are respectively stored at the addresses of "F000", "F001" and "F002" in the return state storing memory (RSM) 14-2.

Figure 17A:
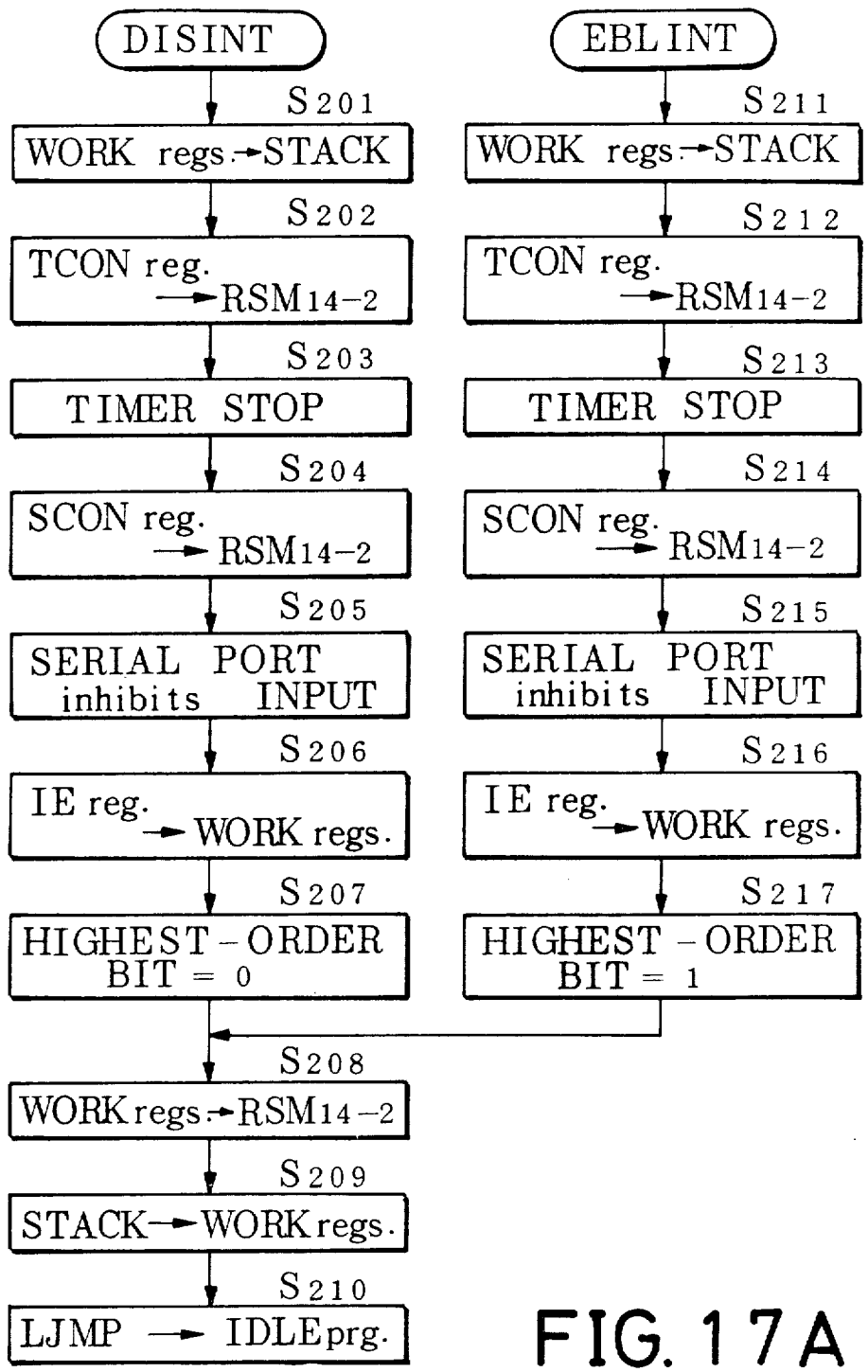
FIG. 17A is a flowchart of the USER STOP program shown in FIG. 15.

FIG. 17A is a flowchart to explain the program of USER STOP (FIG. 15). Executing the USER STOP program, the microprocessor 11 can write the contents of the TCON register, SCON register and IE register into the return state storing memory (RSM) 14-2. The microprocessor 11 executes a conditional jump instruction, so that the microprocessor 11 executes EBLINT (enable interrupt) when the EA bit of the IE register shows "1" or the microprocessor 11 executes DISINT (disable interrupt) when the EA bit of the IE register shown "0".

In the case of execution of the DISINT, the microprocessor 11 read out contents of internal work registers and pushes the contents in a stack. Thereby, the contents, which are caused by execution of a program included in the system under measurement 10 (user program), can be stored into the stack (S201).

The contents of the TCON register are written into the return state storing memory 14-2 (S202). Then the timer counter included in the microprocessor 11 stops counting so that the contents of the TCO register are still (S203). The contents of the SCON register are written into the return state storing memory (RSM) 14-2 (S204), therefore operation of the serial port included in the microprocessor 11 is stopped to inhibit the input thereto (S205). After that, the contents of the IE register are copied to the work registers included the microprocessor 11 (S206). The highest-order bit, which is the EA bit of the copied contents of the IE register, is rewritten to "0" (S207). The contents of the IE register which are stored in the work registers in the step S206 are written into the return state storing memory (RSM) 14-2 (S208). The contents of the stack, which are stored in the step S201, are reloaded into the work registers (S209). All the process are executed so that the LSMP (long jump) instruction is executed in order to jump to the IDLE program (S210).

In case of execution of the EBLINT, each step of from S211 to S216 is respectively the same step as from S201 to S206. In the step of S217, the highest-order bit is rewritten to "1", in order to return the microprocessor 11 to the state in which the program stored in the system under measurement 10 has been executed, because the EA bit was written to "0" as cause of execution of the conditional jump instruction.

Figure 17B:
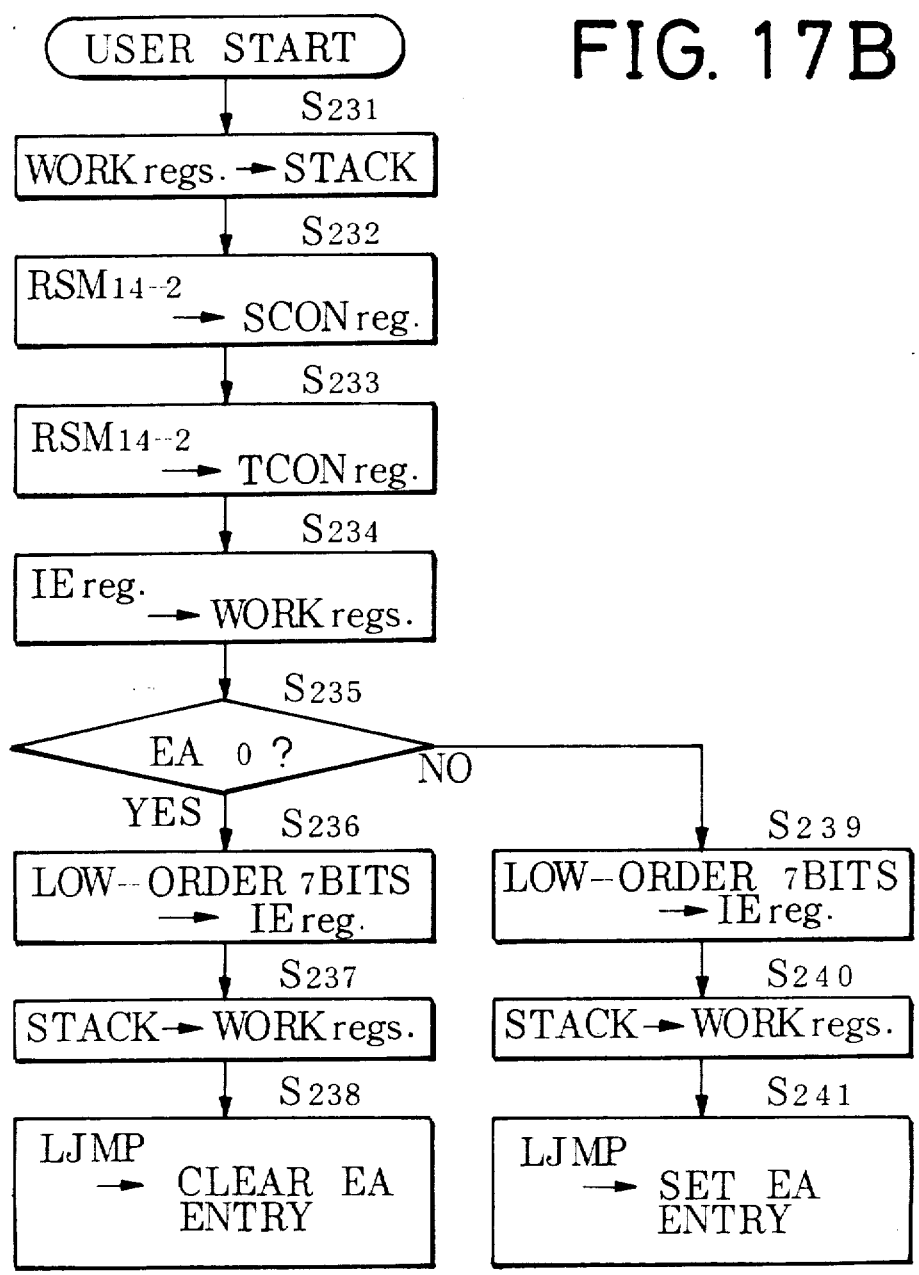
FIG. 17B is a flowchart of the USER START program shown in FIG. 15.

FIG. 17B is a flowchart to explain the program of USER START (FIG. 15) which is stored in the return state storing program memory 14-1. In executing the USER STRT program, contents of the work registers are pushed onto the stack. The contents, which are caused by execution of a program included in the system under measurement 10 (user program) are stored in the stack (S231).

Contents of the SCON register stored in the return state storing memory (RSM) 14-2 are reloaded into the SCON register (S232).

Contents of the TCON register stored in the return state storing memory (RSM) 14-2 are reloaded into the TCN register (S233). Contents of the IE register stored in the return state storing memory (RSM) 14-2 are reloaded into the work registers included in the microprocessor 11 (S234). In the contents of the IE register reloaded into the work registers in the step (S234), the highest-order bit, which is the EA bit, is examined (S235), so that when the EA bit of "0" is detected (S235 yes), the low-order 7 bits are reloaded the IE register (S236). Then the contents of the stack are reloaded into the work registers so that the state of work registers is returned to the previous state of the step S231 (S237).

Thus the contents of SCON, TCON and IE registers are respectively returned to the previous contents of the steps of S202, S204 and S207 or S217. The LJMP instruction is executed in order to clear the EA bit and to reset the EA bit to the previous value "0" (S238).

In the step S235, if the EA bit of "1" is detected (S235 No), the steps of S239 and S240, which are the same as the steps of S236 and S237, are executed. Then the LJMP instruction is executed in order to set the EA bit to "1" (S241).

Figure 17C:
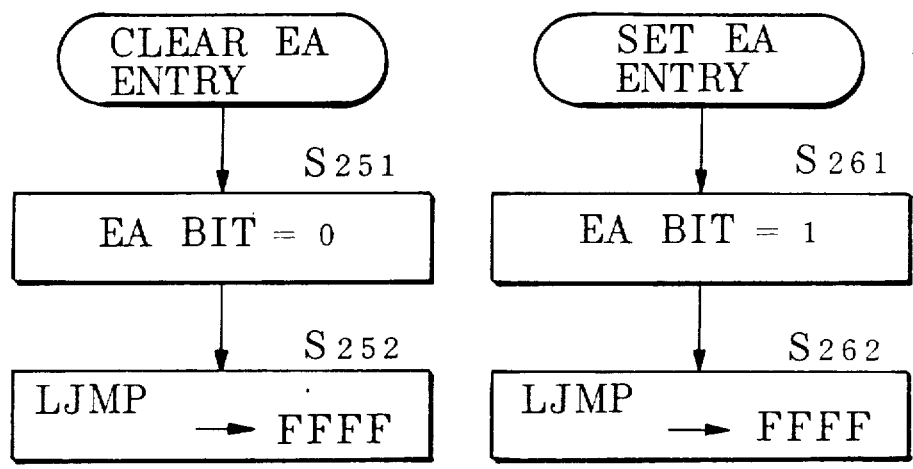
FIG. 17C is a flowchart to explain the program of the LJMP instruction of the steps in FIG. 17B.

FIG. 17C is a flowchart to explain the program of the LJMP instruction of the steps S238 and S241 in FIG. 17B. the LJMP instruction is executed by the microprocessor 11 in order to return to the program included in the system under measurement 10. In case the microprocessor 11 has been jumped from the routine (S238) in which the EA bit has been "0", the microprocessor 11 executes an instruction which rests the EA bit to "0" (S251). Then LJMP instruction to jump to an address of "FFFF" of the user start program stored in the return state storing program memory (RSPM) 14-1 (FIG. 14) is executed (S252). An operand of the LJMP instruction at the address of "FFFF" in the return state storing program memory (RSPM) 14-1 shows a meaningless and unused value.

In case the microprocessor 11 has been jumped from the routine (S241) in which the EA bit has been "1", the microprocessor 11 executes an instruction which sets the EA bit to "1" (S261). Then LJMP instruction to jump to an address of "FFFF" in the return state storing program memory (RSPM) 14-1 is executed (S262). An operand of the LJMP instruction at the address of "FFFF" in the return state storing program memory (RSPM) 14-1 shows a meaningless and unused value.

In programs of the MEMORY READ STATE (FAOO), FIG. 15, MEMORY WRITE START (FBOO), REGISTER READ START (FCOO), REGISTER WRITE START (FDOO), and CONTROL STOP (FEOO), contents of the TCO, SCON and IE registers have been stored in the return state storing memory 14-2, therefore special processes are not needed, and only the programs to jump to the object programs are stored in the return state storing program memory 14-1.

Figure 18:
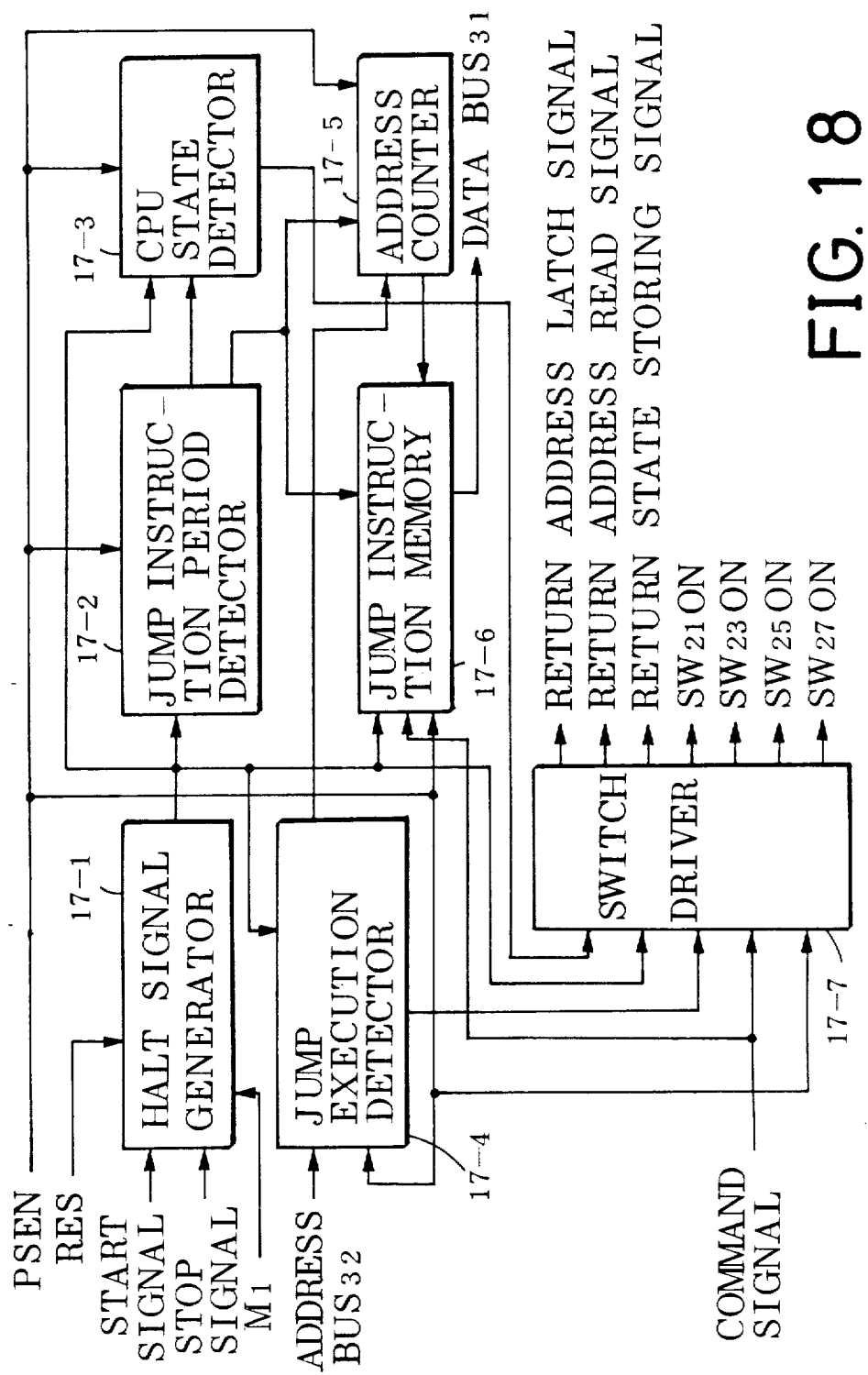
FIG. 18 is a block diagram of the bus exchange and jump command circuit shown in FIG. 1.

FIG. 18 illustrates a block diagram of the bus exchange and jump command circuit 17.

Start, stop and command signals are delivered from the emulator main frame 19. The start and stop signals are used for starting and stopping execution of the programs included in the system under measurement 10 and the control program circuit 15. The command signal is used for commanding execution of one of pgrams (shown in FIG. 26) for which the start and stop signals are used.

17-1 indicates a halt signal generator which generates a halt signal by receiving the PSEN and RES signals of the control bus 33 and the start and stop signals from the emulator main frame 19. The "L" level of the halt signal indicates a pseudo stopping of the microprocessor 11.

17-2 identifies a jump instruction period detector which detects a period to force the microprocessor 11 to read a conditional jump instruction at the trailing edge of the HALT signal.

17-3 denotes a CPU state detector to detect a period for which the state of the microprocessor 11 are returned to the previous state in which operation of the TCON, SCON and IE registers was stopped by the execution of the return state storing program stored in the return state storing program memory 14-1.

17-4 designates a jump execution detector to detect that the conditional jump instruction, which forces the microprocessor 11 to read at the trailing edge of the HALT signal, is executed.

17-5 represents an address counter to count a period for which the microprocessor 11 is forced to read the conditional jump instruction and to deliver an address for reading the conditional jump instruction.

17-6 shows a jump instruction memory which stores LJMP instructions and the conditional jump instruction for starting or stopping execution of the programs included in the system under measurement 10 or in the control program circuit 15.

17-7 refers to a switch driver which delivers a return address latch signal, a return address read signal, a return state storing signal, a SW21ON signal, a SW23ON signal, a SW25ON signal and a SW27ON signal by receiving the output signals of the halt signal generator 17-1, the CPU state detector 17-3 and the jump execution detector 17-4, the command signal and the PSEN and RES signals on the control bus. The SW21ON signal is used for switching on the switches 21 and 22 (FIG. 1). The SW23ON signal is used for switching on the switches 23 and 24 (FIG. 1). The SW25ON signal is used for switching on the switches 25 and 26 (FIG. 1). The SW27ON signal is used for switching on the switches 27 and 28 (FIG. 1).

Figure 19:
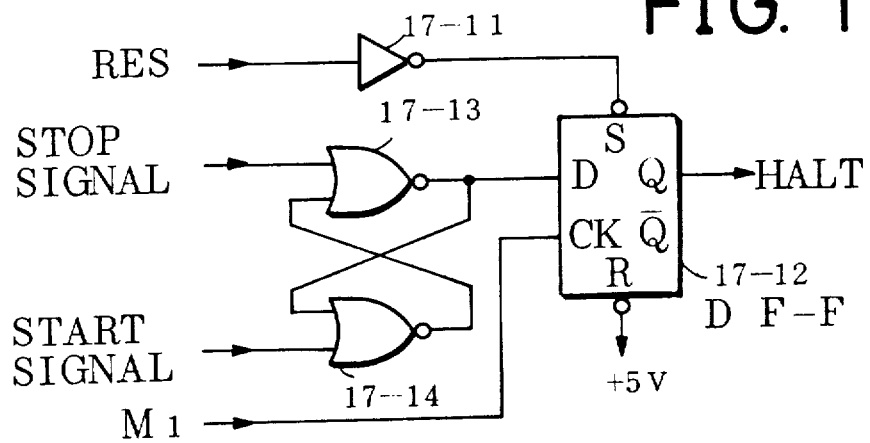
FIG. 19 is a circuit diagram of the halt signal generator shown in FIG. 18.

FIG. 19 illustrates a circuit diagram of the halt signal generator 17-1. The start signal and the stop signal, which are delivered from the emulator main frame 19, are synthesized in NOR gates 17-13 and 17-14 and the synthesized output is added to a D flip-flop 17-12. The D flip-flop 17-12 receives the M1 signal as a clock signal and delivers the HALT signal of "L". The HALT signal is set to the level "H" by the RES (reset) signal through an inverter 17-11 in which the RES signal is used for resetting the microprocessor 11.

Figure 20:
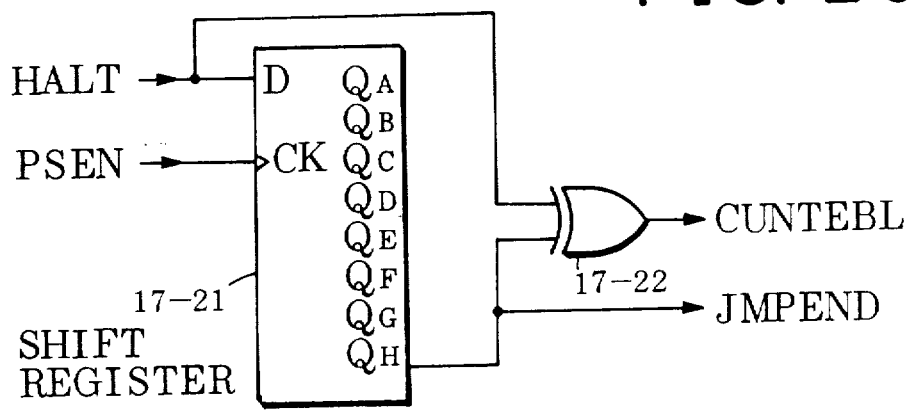
FIG. 20 is a circuit diagram of the jump instruction period detector shown in FIG. 18.

FIG. 20 illustrates a circuit diagram of the jump instruction period detector 17-2. When the HALT signal turns to the level of "L", a shift register 17-21 starts to count 8 cycles of the PSEN signal which is added as clock signal. When the 8 cycles have been counted, a JMPEND signal of "L" is delivered from the shift register 17-21. An exclusive OR gate 17-22, which is added the HALT signal and the JMPEND signal, sends out a CUNTEBL signal which shows the level of "H" between both trailing edges of the HALT and CUNTEBL signals. The CUNTEBEL signal shows a period when the microprocessor 11 is forced to read the conditional jump instruction.

Figure 21:
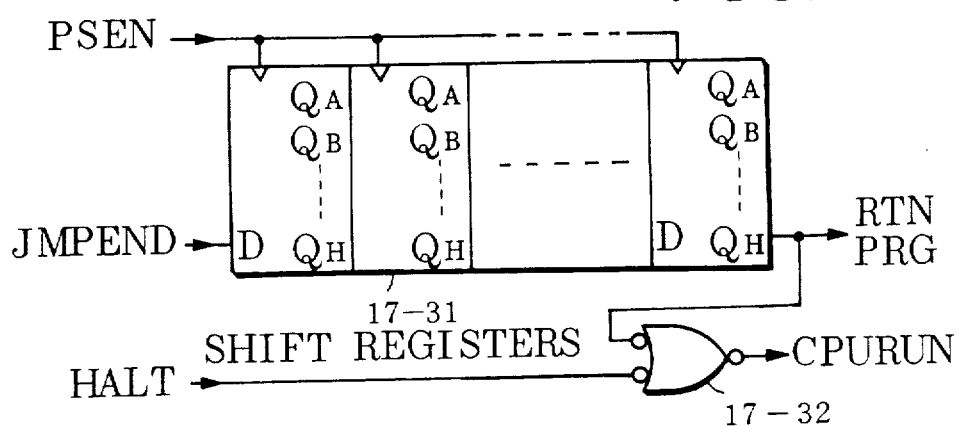
FIG. 21 is a circuit diagram of the CPU state detector shown in FIG. 18.

FIG. 21 illustrates a circuit diagram of the CPU state detector 17-3. Shift registers 17-31 sends out a RTNPRG (return program) signal which shows a period when the microprocessor 11 executes a program in the return state memory circuit 14. The RTNPRG signal is ANDed with the HALT signal in an AND gate 17-32 which delivers the CPURUN signal to show that the microprocessor 11 is in the pseudo stopping state.

Figure 22:
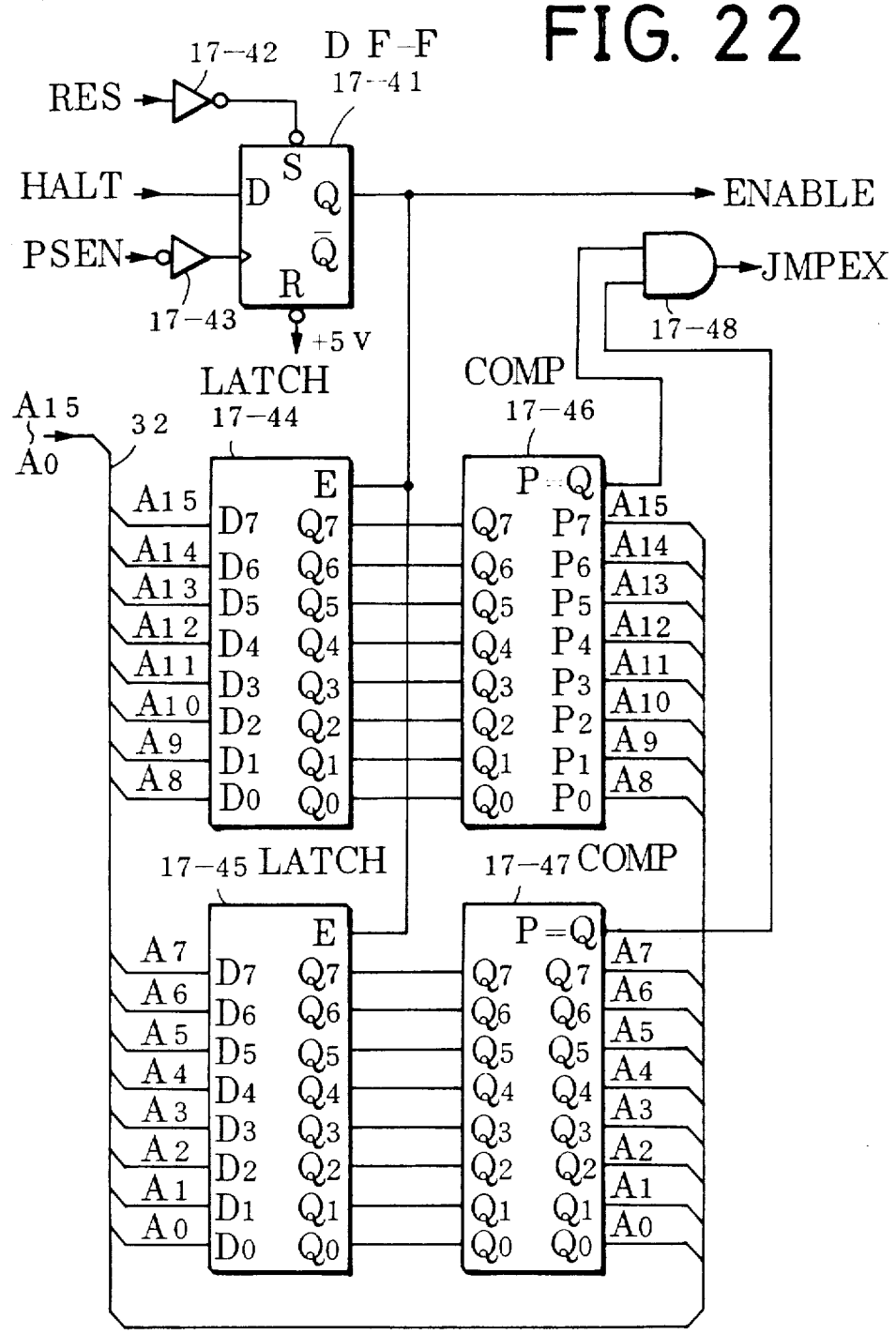
FIG. 22 is a circuit diagram of the jump execution detector shown in FIG. 18.

FIG. 22 illustates a circuit diagram of the jump execution detector 17-4 to detect that the microprocessor 11 has executed the conditional jump instruction. The ENABLE signal turns to "L" synchronizing with the trailing edge of the PSEN signal added just after the HALT signal has turned to "L". The ENABLE signal is sent to th switch driver 17-7. Thereby the switch driver 17-7 delivers the return address latch signal. A JMPEX signal turns to "H" when a return address prelatched and a present address from the address bus 32 are compared and both addresses coincide.

An ENABLE signal for latching is generated from an inverter 17-42, an inverter 17-43 and a D flip-flop 17-41 which are added the RES, PSEN and HALT signals. The signal for latching is sent to latches 17-44 and 17-45 which latch an address from the address bus 32. The latched address of the latches 17-44 and 17-45 is added to comparators 17-46 and 17-47 in which the present address from the address bus 32 is compared with the latched address, and when both addresses coincide, coincident signals are delivered from the comparators 17-46 and 17-47. The latch 17-44 and comparator 17-46 are for high-order 8 bits and the latch 17-45 and comparator 17-47 are for low-order bits. The coincident signals are inputted to an AND gate 17-48 which ANDs and delivers the JMPEX signal.

Figure 23:
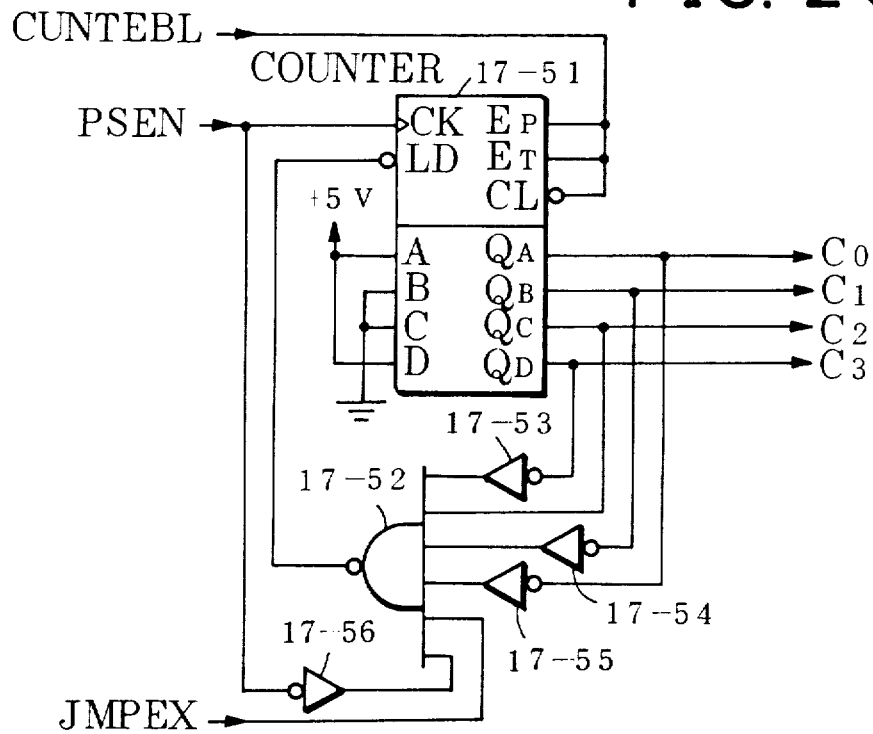
FIG. 23 is a circuit diagram of the address counter shown in FIG. 18.
Figure 24:
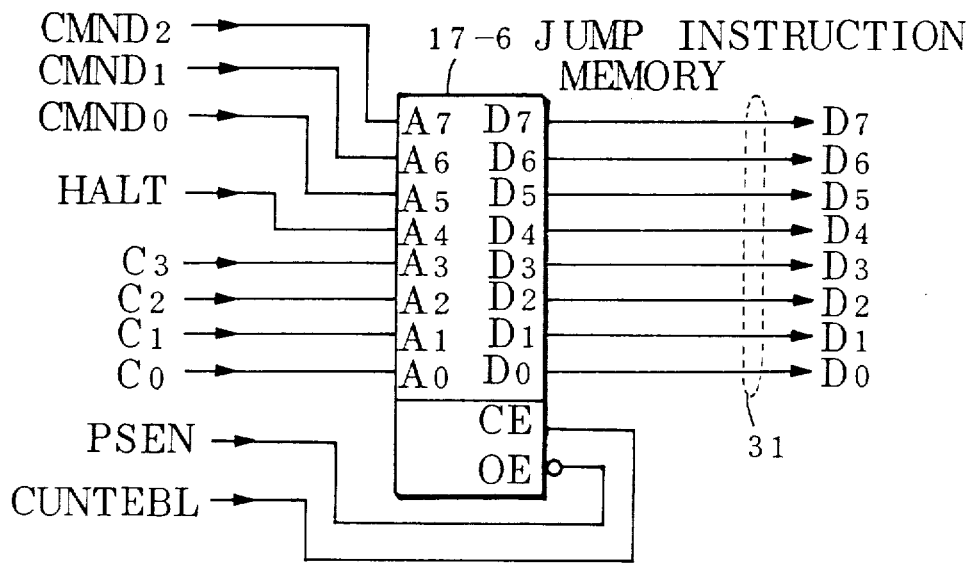
FIG. 24 is a circuit diagram of the jump instruction memory shown in FIG. 18.

FIG. 23 illustrates a circuit diagram of the jump instruction memory 17-6 which is a ROM. The command signal, which is delivered from the emulator main frame 19, consist of from CMMD0 to CMMD2. The jump instruction memory 17-6 is inputted the address of from C0 to C3 delivered from the counter 17-51 (FIG. 23) and the HALT signal, and when the PSEN signal and the CUNEBEL signal is added, the jump instruction memory 17-6 delivers instructions to jump to various addresses to the microprocessor 11 through the data bus 31.

Figure 25:
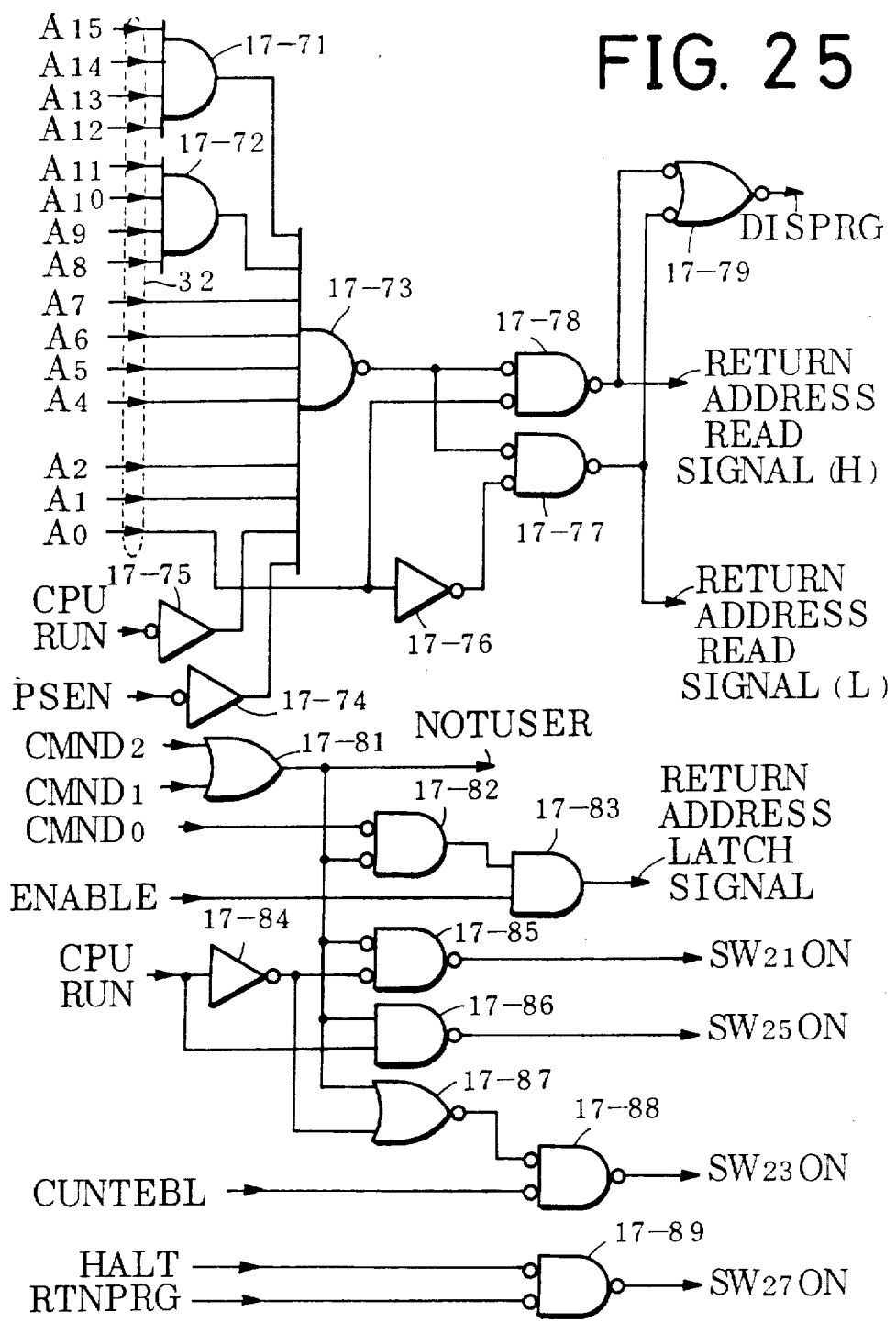
FIG. 25 is a circuit diagram of the switch driver shown in FIG. 18.

FIG. 25 illustrates a circuit diagram of the switch driver 17-7.

An AND gate 17-71, an AND gate 17-72, a NAND gate 17-73, an inverter 17-74, an inverter 17-75 and an OR gate 17-78 generate a return address read signal (H) which is used for reading out high-order 8 bits of the return address latched in the 8 bits latch 13-1 (FIG. 7) in the period $T_{10}$ (FIG. 2). The AND gate 17-71, the AND gate 17-72, the NAND gate 17-73, the inverter 17-74, the inverter 17-75, an inverter 17-76 and an OR gate 17-77 generate a return address read signal (L) which is used for reading out low-order 8 bits of the return address latched in the 8 bits latch 13-2 (FIG. 7) in the period $T_{10}$ (FIG. 2).

An AND gate 17-79 generates a DISPRG (disabled piogram) signal which is used for inhibiting that the microprocessor 11 reads out all the memories except the 8 bits latches 13-1 and 13-2 while the return address is read out from the latches 13-1 and 13-2.

An OR gate 17-81 generates the NOTUSER signal turned to "H" by decoding the command signal (CMND 1 and 2) in the period T₄ (FIG. 2), when the execution of the control programs is required.

The OR gate 17-81, a NOR gate 17-82 and an AND gate 17-83 generate the return address latch signal which is sent to the 8 bits latches 13-1 and 13-2 (FIG. 7) in the return address memory circuit 13 at the end of the period T₁ (FIG. 2).

The OR gate 17-81, an inverter 17-84 and an OR gate 17-85 generate the SW21ON signal which is used for switching switches 21 and 22 between the system under measurement 10 and the microprocessor 11.

The OR gate 17-81, the inverter 17-84, a NOR gate 17-87 and an OR gate 17-88 generate the SW23ON signal which is used for switching switches 23 and 24 between the control program circuit 15 and idle program circuit 16 and the microprocessor 11.

The OR gate 17-81 and a NAND gate 17-86 generate the SW25ON signal which is used for switching switches 25 and 26 between the control program circuit 15 and the microprocessor 11.

An OR gate 17-89 generates the SW27ON signal which is used for switching switches 27 and 28 between the idle program circuit 16 and the microprocessor 11.

FIG. 26 illustrates contents stored in the jump instruction memory 17-6, wherein addresses are shown with hexadecimal notation.

The USER STOP program stored at the address "00" is read by the microprocessor 11 in order to stop execution of a program included in the system under measurement 10.

The USER START program is read by the microprocessor 11 in order to restart execution of the program included in the system under measurement 10.

The MEMORY READ STOP program stored at the address "20" is read by the microprocessor 11 in order to stop to read internal memories of the system under measurement 10 and the microprocessor 11, after the internal memories having been read.

The MEMORY READ START program stored at the address "30" is read by the microprocessor 11 in order to start to read the internal memories of the system under measurement 10 and the microprocessor 11.

The MEMORY WRITE STOP program stored at the address "40" is read by the microprocessor 11 in ordere to stop to write into the internal memories of the system under measurement 10 and the microprocessor 11, after the internal memories having been written.

The MEMORY WRITE START program stored at the address "50" is read by the microprocessor 11 in order to start to write into the internal memories of the system under measurement 10 and the microprocessor 11.

The REGISTER READ STOP program stored at the address "60" is read by the microprocessor 11 in order to stop to read the internal registers of the microprocessor 11, after the registers having been written.

The REGISTER READ START program stored at the address "70" is read by the microprocessor 11 in order to read the internal registers of the microprocessor 11.

The REGISTER WRITE STOP program stored at the address "80" is read by the microprocessor 11 in order to stop to write into the internal registers of the microprocessor 11, after the registers having been written.

The REGISTER WRITE START program stored at the address "90" is read by the microprocessor 11 in order to start to write into the internal registers of the microprocessor 11.

FIG. 27 illustrates the USER STOP program stored in the jump instruction memory 17-6, wherein addresses are shown with hexadecimal notation.

A JBC (jump if bit is set and clear bit) instruction, which is a conditional jump instruction, is stored at the address "00". The JBC instruction instructs that if the instructed bit is "1", clear the bit to "0" and jump to the instructed address.

A EA bit is stored at the address "01" in which the data to instruct the bit to be examined in the JBC instruction is stored.

The data showing an address to be jumped to is stored with the 2s complement at the address "02". The data is used when the bit instructed by the EA bit at the address "01" was "1". In the program, the value (adrs −3) indicated at the address "02" is "FD" (not shown) corresponding to "−3". The "−3" means to jump to the address "00".

A NOP instruction is stored at the address "03". The NOP instruction is not executed by the microprocessor 11.

A LJMP instruction is stored at the address "04". The LJMP instruction is used for jumping to the address in which the USER STOP program in the return state storing programs is stored.

An address of the return state storing program to be jumped to is stored at the addresses "05" (high-order) and "06" (low-order). In case the EA bit is "0" and the JBC instruction is therefore not executed, the address to be jumped to is utilizable.

A NOP instruction is stored at the address "07" the same as at the address "03".

A LJMP instruction is stored at the addresses "08", "09" and "0A". The LJMP instruction is executed when the JBC instruction at the address "00" has been executed, namely the EA bit of the IE register included in the microprocessor 11 has been "1". It is impossible to directly examine the EA bit being "1" or "0". However the EA bit being "1" can indirectly be examined by detection of execution of jump instruction.

A NOP instruction is stored at the address "0B" the same as at the addresses "03" and "07".

Receiving the addresses instructed by the address counter 17-5, the jump instruction memory 17-6 delivers the JBC instruction at the address "00", the EA bit being the conditional object at the address "01", the address to be jumped to at the address "02" and the NOP instruction at the address "03" in series. In this process, the microprocessor 11 examines the EA bit of the IE register.

In case the EA bit is "0", the JBC instruction is not executed, therefore the level of the JMPEX signal, which is delivered from the jump execution detector 17-4, is "L" and the address counter 17-5 is not reloaded. Then the counter 17-51 in the address counter 17-5 delivers "0100" at from C3 to C0 (FIG. 23). The "0100" delivered from the counter 17-51 indicates the address "04" in FIG. 27. Receiving the address "04", the jump instruction memory 17-6 sends out the address instructed in the addresses "05" and "06" in FIG. 26. Thus the microprocessor 11 jumps to the instructed address in which the DISINT of the programs for USER STOP is stored, and executes the DISINT (FIG. 17A).

In case the EA bit is "1", the JBC instruction is executed. Then, by reading out the value (adrs −3) indicated at the address "02", the execution of the microprocessor 11 is returned to the address "00" in which the JBC instruction is stored. The address "00" is coincident with the address latched in the latches 17-44 and 17-45 at the start of the program for USER STOP, therefore the JMPEX signal of "H" is delivered from the AND gate 17-48 (FIG. 22).

Receiving the JMPEX signal of "H", the counter 17-51 is loaded with "9" and the jump instruction memory 17-6 delivers the address to be jumped to which is instructed at the addresses "09" and "0A" in FIG. 27. Thus the microprocessor 11 jumps to the instructed address in which the EBLINT of the programs for USER STOP is stored, and executes the EBLINT (FIG. 17A).

Figure 28:
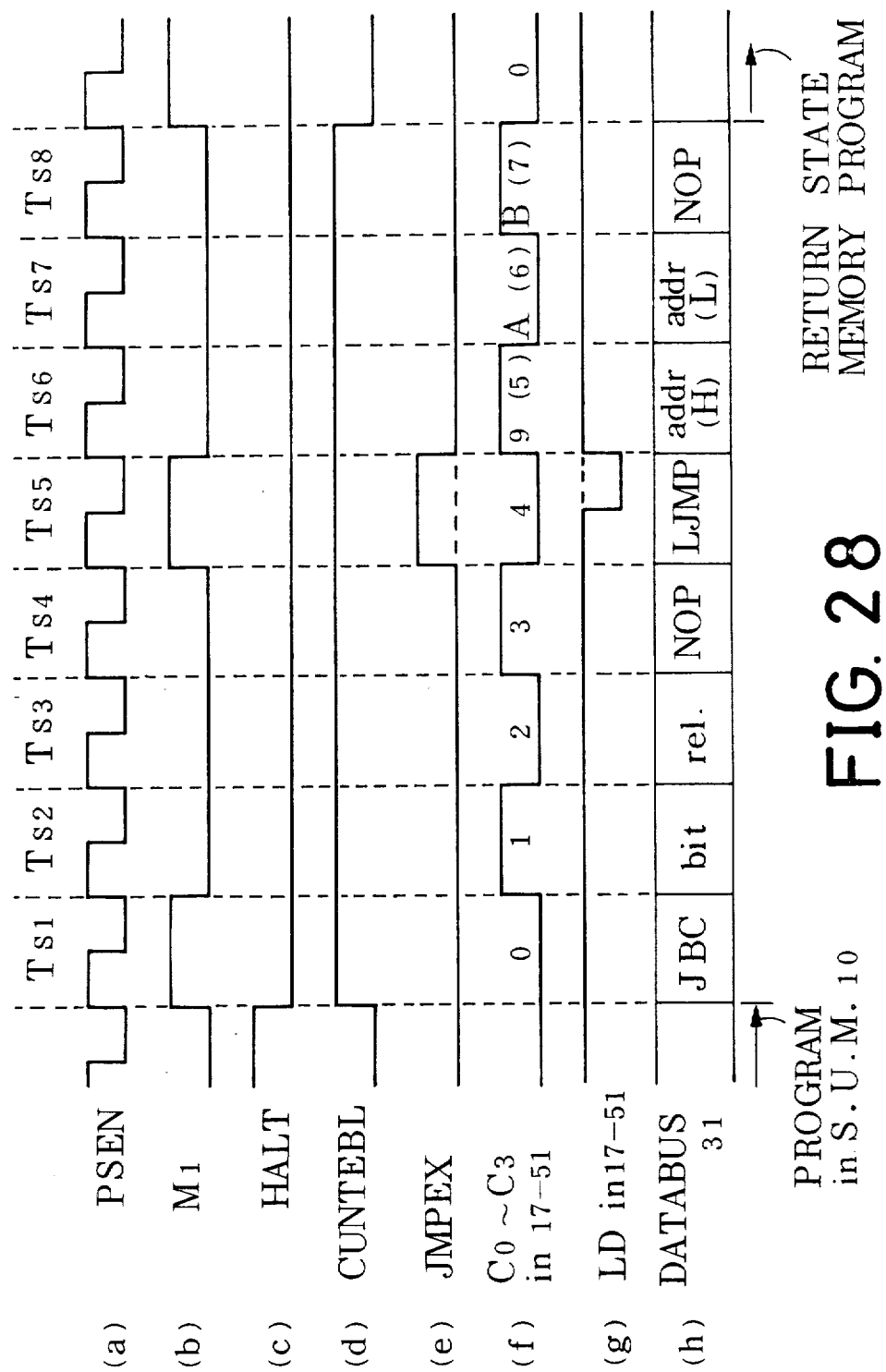
FIG. 28 is a timing chart for explaining an aspect of the execution of the USER STOP program shown in FIG. 27.

FIG. 28 shows a timing chart for explaining an aspect of the execution of the program for USER STOP shown in FIG. 27.

At the start of period $T_{S1}$, the stop signal is sent from the emulator main frame 19 in order to stop execution of a program included in the system under measurement 10. Then the M1 signal of (b) is delivered from the M1 detection circuit 12. The M1 signal shows the level of "H" during the period $T_{S1}$. Synchronizing with the M1 signal, the HALT signal of (C) turns to the level of "L" which is sent to the jump instruction period detector 17-2, so that the CUNTEBL signal of (d) changes to the level of "H". Thereby, the counter 17-51 starts to count the PSEN signal of (a). The counter 17-51 delivers an output of "0" at the terminals from C0 to C3 as shown in (f).

The jump instruction memory 17-6 added the output of "0" from the counter 17-51 delivers the JBC instruction at the address "00' to the data bus 31.

In the period $T_{S2}$, the output of the counter 17-51 shows "1" as shown in (f). Therefore the jump instruction memory 17-6 delivers the highest-order bit in the IE register as shown (h), namely, the second byte of the JBC instruction to the data bus 31.

In the period $T_{S3}$, the output of the counter 17-51 shows "2" as shown in (f). The jump instruction memory 17-6 delivers the value of "FD" (not shown) corresponding to the relative address "−3" at the address "02" (FIG. 27) to the data bus 31 as shown in (h).

In the period $T_{S4}$, the output of the counter 17-51 shows "3" as shown in (f). The jump instruction memory 17-6 delivers a value indicating the NOP instruction at the address "03" (FIG. 27) to the data bus 31 as shown in (h).

In the period $T_{S5}$, the output of the counter 17-51 shows "4" as shown in (f). The jump instruction memory 17-6 delivers a value indicating the LJMP instruction to the data bus 31 as shown in (h). In case the highest-order bit of the IE register, namely, the EA (enable all interrupt bit) showed "1" in execution of the JBC instruction of the period $T_{S1}$, the microprocessor 11 executes the JBC instruction, therefore the microprocessor 11 delivers the same address as that in the period $T_{S1}$ to the M1 detection circuit 12 and the comparator 17-46 and 17-47 of the jump execution detector 17-4 via the address bus 32. Then the M1 detection circuit 12 generates the M1 signal as shown in (b) and the jump execution detector 17-4 delivers the JMPEX signal of "H" as shown in (e) to the address counter 17-5. The load terminal LD of the counter 17-51 in the address counter 17-5 added the JMPEX signal is added the level "L" as shown in (g), therefore, the offset address "9" is loaded into the counter 17-51.

In case the EA bit showed "0" in execution of the JBC instruction of the period $T_{S1}$, the microprocessor 11 does not execute the JBC instruction and delivers the next address to the comparators 17-46 and 17-47 of the jump execution detector 17-4 via the address bus 32. As the next address delivered from the microprocessor 11 does not coincide with the address latched into the latches 17-44 ad 17-45 in the period $T_{S1}$, the JMPEX signal is still in the level "L" as shown with a dotted line in (e) and the load terminal LD of the counter 17-51 in the address counter 17-5 added the JMPEX signal of "L" is not loaded as shown with a dotted line in (g).

In the periods $T_{S6}$ and $T_{S7}$, in case the JBC instruction was executed namely the EA bit showed "1", the ouput of the counter 17-51 shows "9" and "A" as shown in (f).

Therefore, the jump instruction memory 17-6 delivers the addresses "09" and "0A" (FIG. 27).

In case the JBC instruction was not executed namely the EA bit showed "0", the output of the counter 17-51 shows "5" and "6" as shown in (f). Therefore, the jump instruction memory 17-6 delivers the addresses "05" and "06" (FIG. 27).

In the period $T_{S8}$, the output of the counter 17-51 shows "B" (when EA=1) or "7" (when EA=0) as shown in (f). The microprocessor 11 reads the NOP instruction at the address "0B" or "07", and jumps to each instructed address.

FIGS. 29A, 29B, 29C, 29D, 29E and 29F show a flowchart of the operation of the apparatus of the invention.

Figure 29A:
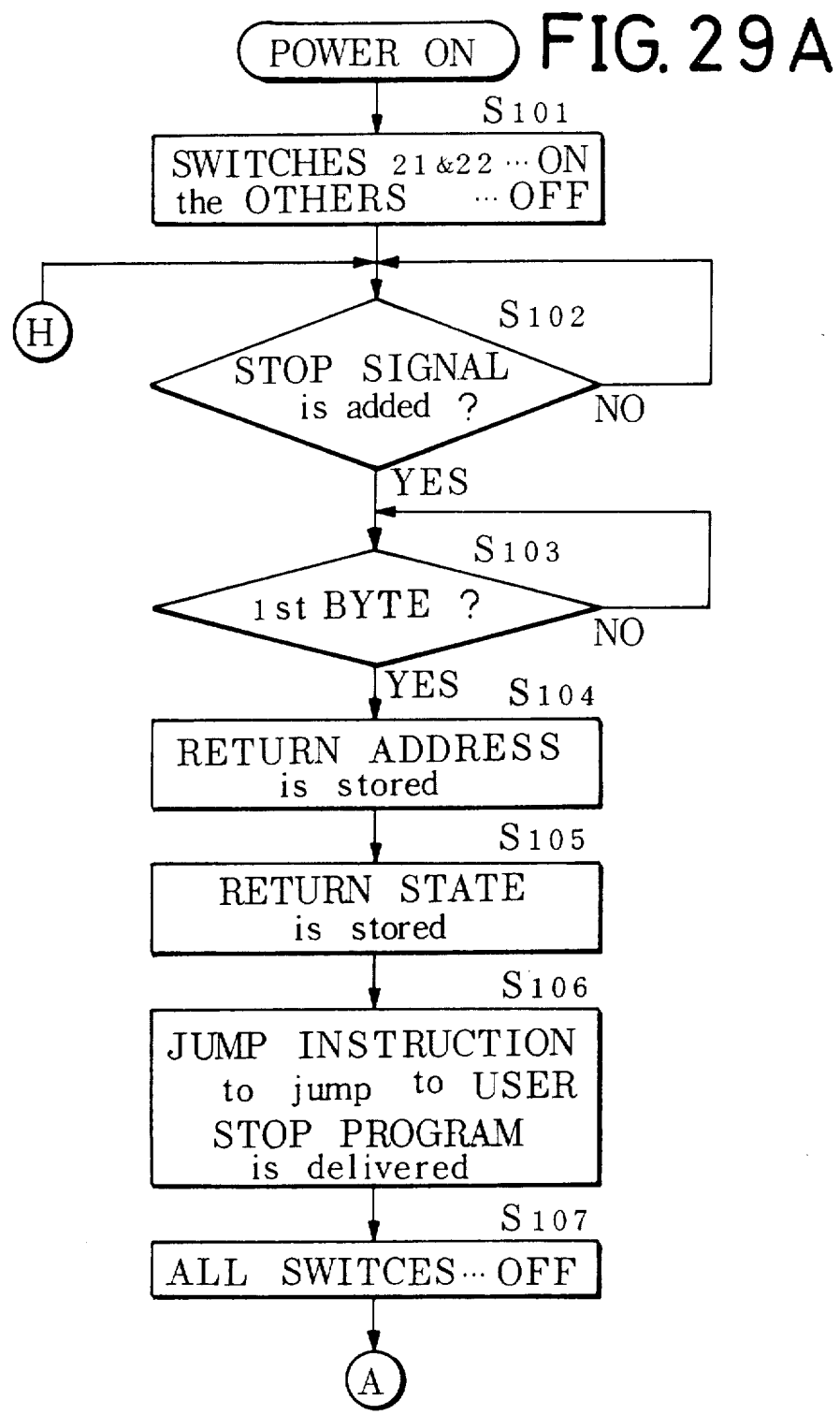
Figure 29C:
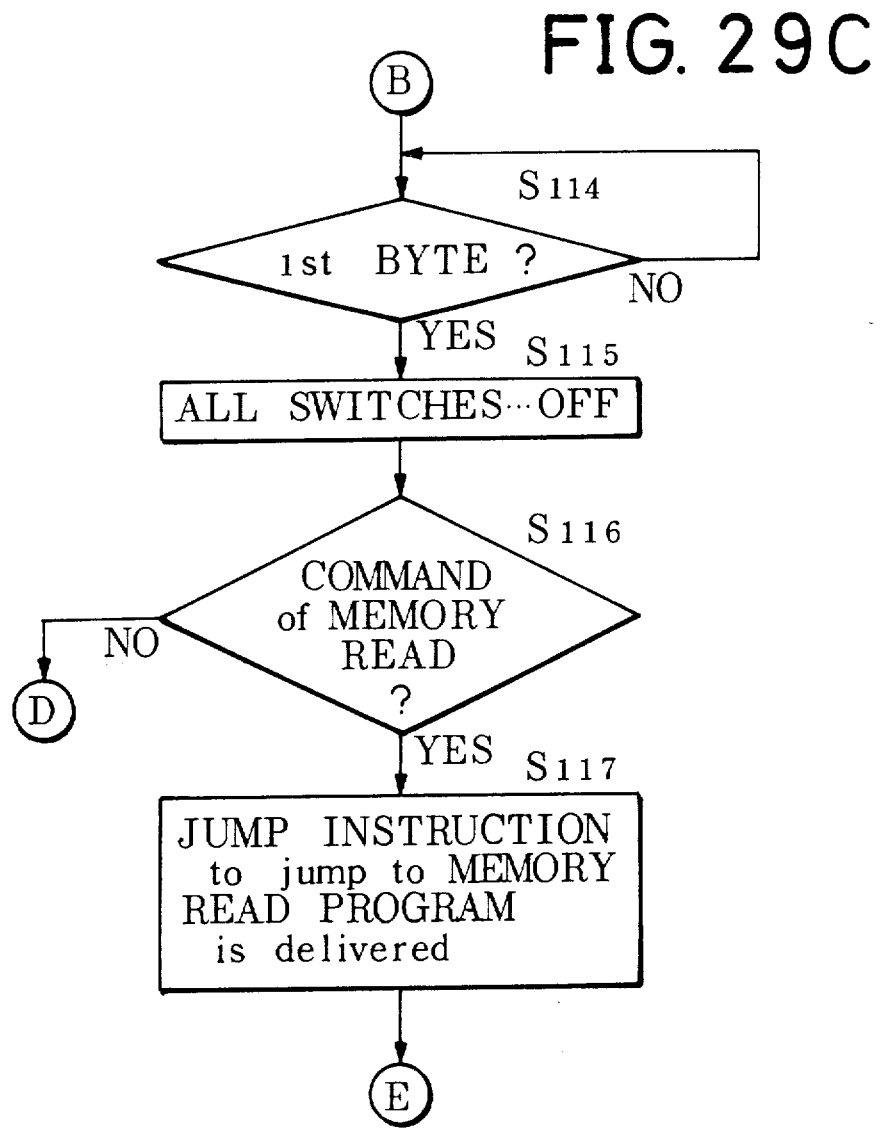
Figure 29D:
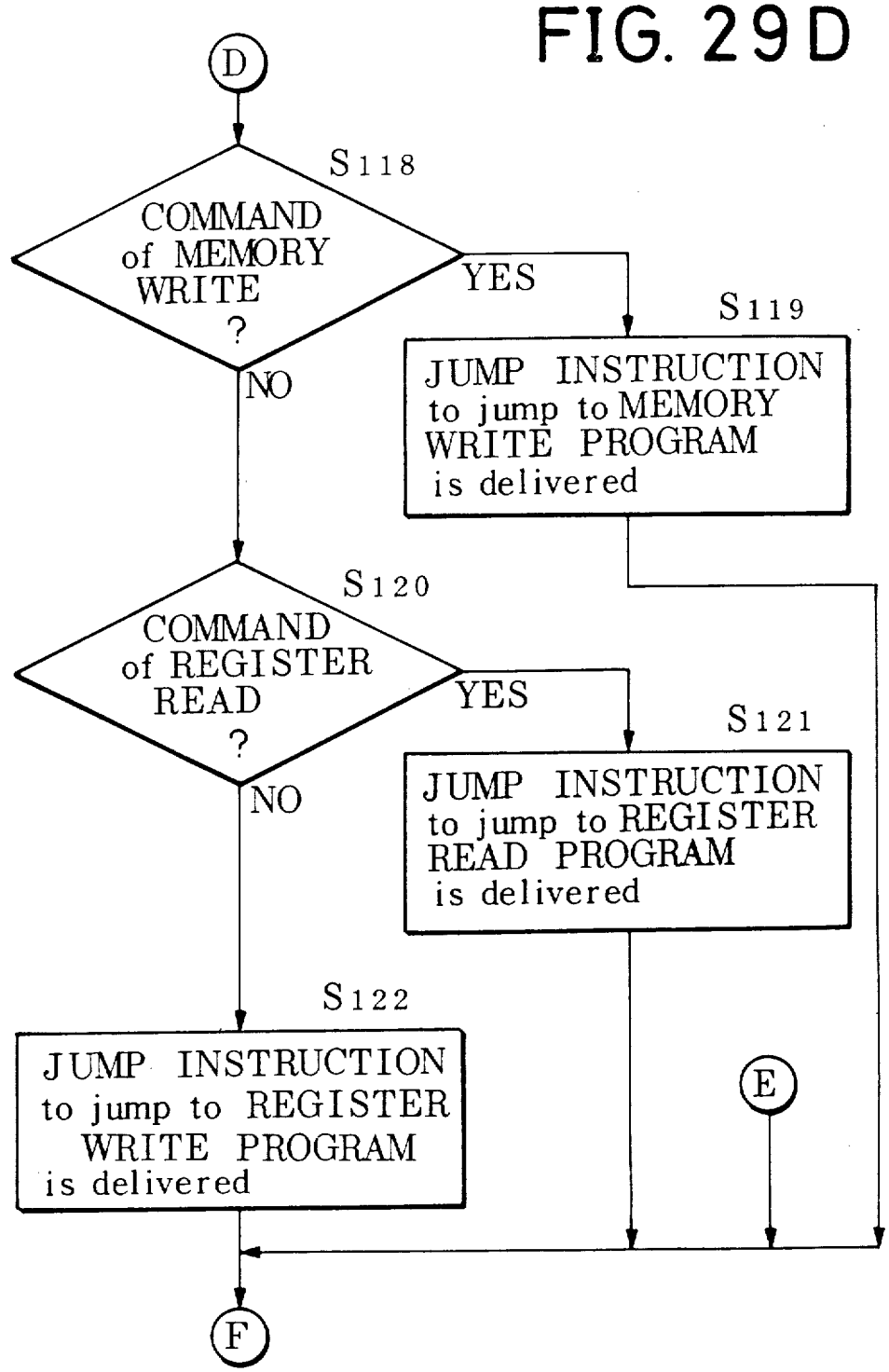

After power on, the bus exchange and jump command circuit 17 switches on the switches 21 and 22 and switches off the other switches from 23 to 28 to make the microprocessor 11 execute the program of the system 10 for a period $T_1$ (S101, FIG. 29A).

In the period $T_1$, when the stop signal is added from the emulator main frame 19 to the bus exchange and jump command circuit 17 (S102), the M1 detection circuit 12 always detects the 1st byte of the instruction, for example, consisting of 3 bytes which instruction is sent from the program memory of the system 10 and sends the detected output, namely, the M1 signal to the bus exchange and jump command circuit 17 (S103).

The circuit 17 makes the return address memory circuit 13 and the return state memory circuit 14 operate by the M1 signal being provided from the M1 detection circuit 12 immediately after the receipt of the stop signal in the step S102. At the same time, the bus exchange and jump command circuit 17 makes the return address memory circuit 13 and the return state memory circuit 14 store the address of the 1st byte of the instruction being provided from the program memory included in the system 10 (S104) and the value registered in the registers included in the microprocessor 11 respectively the instant that the M1 signal is provided to the circuit 17 (S105, S106), and makes the switches 21 and 22 switch off for a period $T_2$ as shown in FIG. 2 (S107).

Thereafter, the bus exchange and jump command circuit 17 makes the switches 27 and 28 switch on for a period $T_3$ (S108, FIG. 29B), feeds out the jump instruction (command) for jumping to the program memorized in the idle program circuit 16 via the data bus 31, synchronizing with the M1 signal and makes the microprocessor 11 read the jump command, for example, consisting of 3 bytes (S109).

Thereafter, the bus exchange and jump command circuit 17 makes the switches 23 and 24 switch on for a period $T_4$ shown in FIG. 2 (S110), and makes the microprocessor 11 connect to the idle program circuit 16 so that the microprocessor 11 reads and executes the command memorized in the idle program circuit 16, therefore the pseudo stopping state is caused for the period $T_4$. In the pseudo stopping state, the program of the system 10 is not executed and no change is caused in the registers of the microprocessor 11 (S111).

Being fed the command signal for selecting a program to read or modify the matter memorized in the internal registers and memories of the microprocessor 11 and the memories of the system 10, and the start signal for executing the selected program (S112, S113), the bus exchange and jump command circuit 17 makes the switches 23, 24, 27 and 28 switch off for a period $T_5$ shown in FIG. 2 synchronizing with the M1 signal (S114, S115, FIG. 29C), makes the idle program circuit 16 cut off from the bus 30 and sends out the jump command.

If the jump command indicates to read out the control programs stored in the control program memory 15-1 (S116 yes), the bus exchange and jump command circuit 17 delivers the jump instruction to jump to the memory read program (FIG. 10) stored in the control program memory 15-1 to the microprocessor 11 (S117).

In the step S116, if the jump command does not indicate to read out the control programs stored in the control program memory 15-1 (S116 NO), and if the jump command indicates to write control data into the control data memory 15-2 (S118 YES, FIG. 29D), the bus exchange and jump command circuit 17 delivers the jump instruction to jump to the memory write program (FIG. 10) stored in the control program memory 15-1 to the microprocessor 11 (S119).

In the step S118, if the jump command does not indicate to write control data in to the control data memory 15-2 (S118 NO) and if the jump command indicates to read a register included in the microprocessor 11 (S120 YES), the bus exchange and jump command circuit 17 delivers the jump instruction to jump to the register read program (FIG. 10) stored in the control program memory 15-1 to the microprocessor 11 (S121).

In the Step S120, if the jump command does not indicate to read a register included in the microprocessor 11 (S120 NO), the bus exchange and jump command circuit 17 delivers the jump instruction to jump to the register write program (FIG. 10) stored in the control program memory 15-1 to the microprocessor 11 (S122).

The steps 115 to 122 are executed for the $T_5$ in FIG. 2.

Figure 29E:
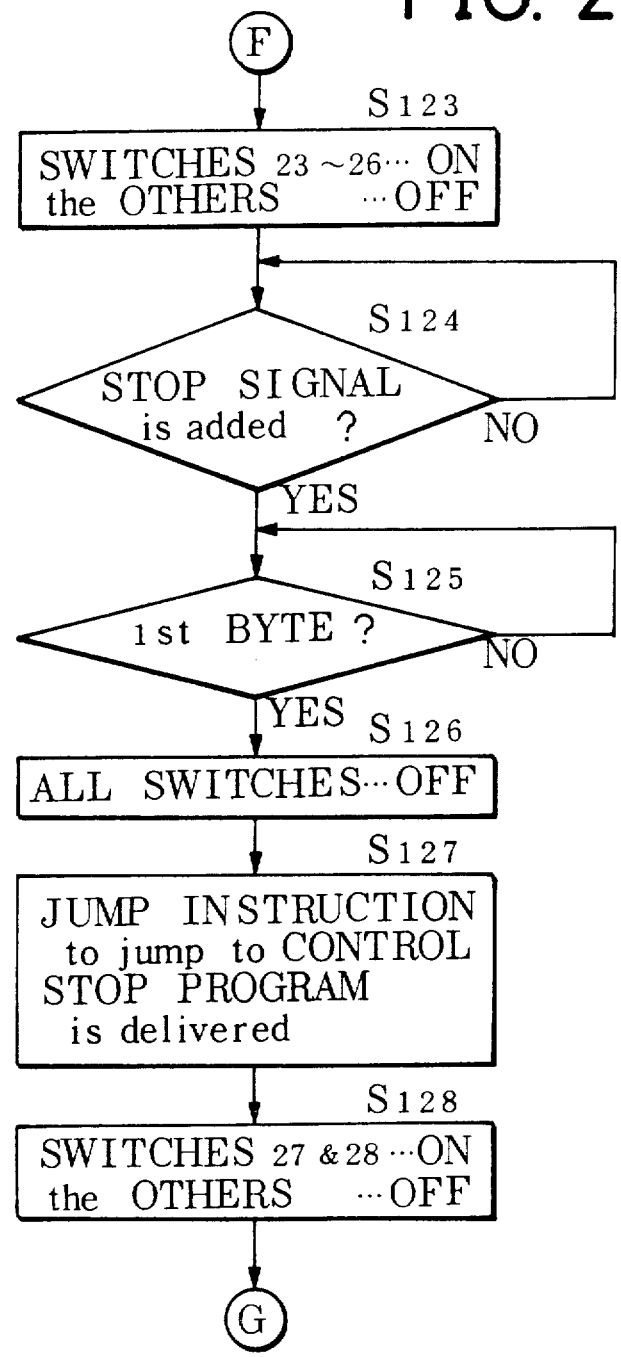
Figure 29F:
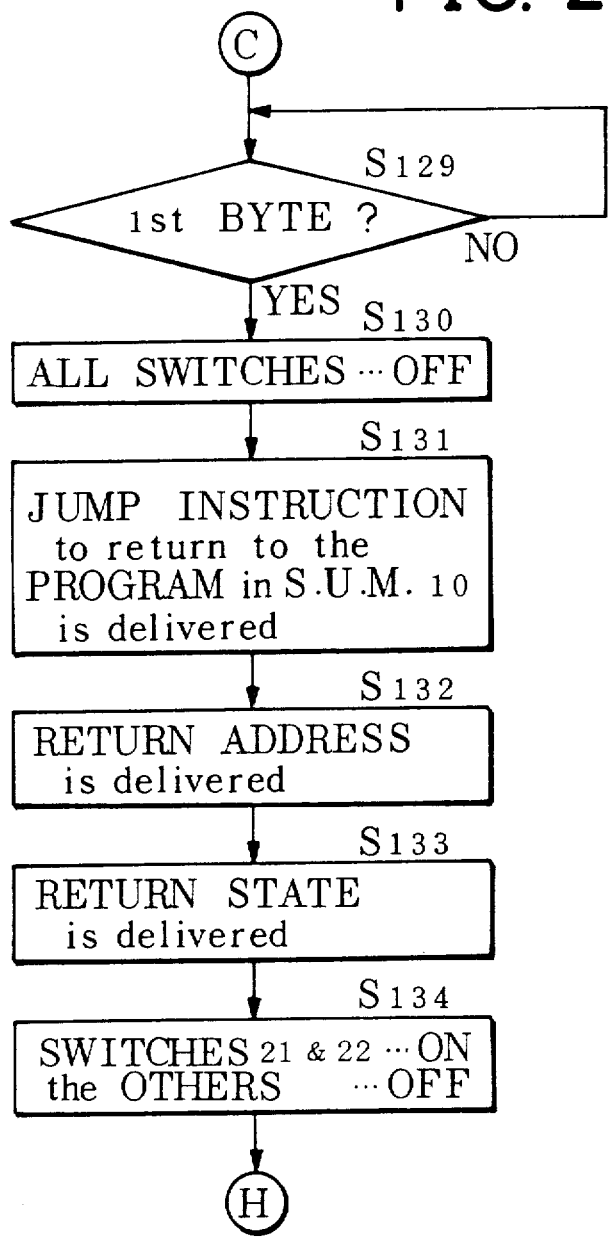

After executions of the steps S117, S119, S121 and S122, the switches 23, 24, 25 and 26 being switched on for a period $T_6$, the control program circuit 15 is connected to the microprocessor 11 (S123, FIG. 29E). Therefore, according to the program memorized in the control program circuit 15, the matter memorized in the internal registers and memories of the microprocessor 11 and the memory of the system 10 can be red and modified by the jump command. The address to jump to in the control program circuit 15 can be indicated or changed by the command signal.

If the stop signal is added to the bus exchange and jump command circuit 17 for the period $T_6$ (S124) and if the M1 detection circuit 12 detects the first byte in reading cycles of an instruction of the programs delivered from the control program circuit 15 and delivers the M1 signal for the period $T_6$ (S125), the bus exchange and jump command circuit 17 being fed the M1 signal makes the switches 23, 24, 25 and 26 switch off for a period $T_7$ shown FIG. 2 (S126).

Then the jump instruction to jump to the control stop program stored in the return state memory circuit 14 is delivered by the bus exchange and jump command circuit 17 to the microprocessor 11 for the period $T_7$ (S127).

Thereafter, the bus exchange and jump command circuit 17 makes the switches 27 and 28 switch on for a period $T_8$ shown in FIG. 2 (S128), feeds out the jump command for jumping to the program stored in the idle program circuit 16 to the data bus 31, synchronizing with the M1 signal and makes the microprocessor 11 read the jump command for jumping to the program memorized in the idle program circuit 16 for the period $T_8$ (S109, FIG. 29B).

After that, the switches 23 and 24 being switched on for a period $T_9$ shown in FIG. 2 (S110), the microprocessor 11 is connected with the idle program circuit 16, reads and executed the command stored in the idle program circuit 16, therefore the pseudo stopping state is caused for the period $T_9$ (S111).

The bus exchange and jump command circuit 17 is fed the command signal for selecting a program to read or modify the matter memorized in the internal resisters and memories of the microprocessor 11 and the memories of the system 10, and the start signal which is the restart command for executing the selected program for the period $T_9$ (S112 YES, S113 YES). If the M1 detection circuit 12 detects the first byte of the instruction and delivers the M1 signals at the end of the period $T_9$ (S129, FIG. 29F), the bus exchange and jump command circuit 17 makes the switches 23, 24, 27 and 28 switch off for a period $T_{10}$ shown in FIG. 2 (S130), synchronizing with the M1 signal, and sends out an operation code (opecode) to the data bus 31, and makes the microprocessor 11 read the jump instruction for jumping to the program of the system 10 (S131). Then, the operation code is the 1st byte of the jump instruction, for example, consisting of 3 bytes wherein the 1st byte indicates the jump instruction (command), and the 2nd byte and the 3rd byte, which are called operands, show the address to jump to.

Thereafter, the bus exchange and jump command circuit 17 reads the two operands, and transmits synchronously the state and the address to be returned to, which were respectively memorized at the beginning of the period $T_2$ in the return state memory circuit 14 and the return address memory circuit 13, to the bus 30 for the period $T_{10}$ (S132, S133). Thereafter the switches 21 and 22 are switched on for the period $T_1$ shown in FIG. 2 (S134). Thus, the series of the operations for emulating is ended and returned again to the state of the period $T_1$.

Depending on the invention, as described above, even if a program included in the system under measurement masks the system to inhibit an interrupt signal or a microprocessor in the system has no interrupt terminal, it is effectively available to emulate the system without developing a special microprocessor with the interrupt terminal to be employed in the system.

It is to be understood that the invention is not limited in its application to the details of construction and arrangement of elements illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A microprocessor emulation apparatus comprising:
    emulator main frame means for sending out a stop signal, a start signal and a command signal;
    emulator unit means comprising;
    bus exchange means connected to said emulator main frame means for operating upon receipt of said stop signal, said start signal or said command signal from said emulator main frame means;
    microprocessor means for executing upon receipt of a command from said bus exchange means;
    control program means for memorizing an analysis program to analyze an operation of a system under measurement; and
    bus means which includes switch means controlled by said bus exchange means for connecting between said bus exchange means, said microprocessor means, said control program means, and said system under measurement to be transmitted said stop signal, said start signal and said command signal from said emulator main frame means via said bus change means: wherein
    said emulator unit means comprises;
    M1 detection means for detecting a 1st byte of a command of a program which is transmitted on said bus means from said system and for sending out a detection signal;
    return address memory means for memorizing an address indicated in a 1st byte of said program included in said system under measurement upon receipt of said stop signal to stop executing said program by indications of said microprocessor means and for sending out said address to said system via said bus means to return to said address by indications of said microprocessor means when said start signal is fed thereafter;
    return state memory means for memorizing a value registered in a register included in said microprocessor means upon receipt of said stop signal to make said microprocessor means stop executing said program and for sending out said value registered in said register to said bus means to make said microprocessor means return to a state upon receipt of said stop signal when said start signal is, thereafter, fed;
    idle program means for memorizing a pseudo stopping program to produce a pseudo stopping state in which said microprocessor means does not execute said program included in said system upon receipt of said stop signal; whereby
    said bus exchange means exchanges said bus means including said switch means upon receipt of said detection signal from said M1 detection means,
    said pseudo stopping state is produced by said stop signal,
    an analysis state for executing said analysis program memorized in said control program means is produced upon receipt of said command signal and said start signal, and
    a jump command is sent out to produce said pseudo stopping state when said stop signal is fed thereafter,
    so as to read contents memorized in said system and to modify said contents.

2. A microprocessor emulator apparatus claimed in claim 1, wherein said M1 detection means comprises:
    a machine cycle memory for storing the number of machine cycles of instructions stored in said system which machine cycles are required for execution of said instructions; and
    a machine cycle counter for counting said number of machine cycles by counting clock pulses which are used to read and execute an instruction in said microprocessor means, and for delivering said detection signal by detecting said first byte of said instruction.

3. A microprocessor emulation apparatus claimed in claim 1, wherein said return address memory means comprises two latches which respectively latch high-order and low-order address of said program included in said system under measurement.

4. A microprocessor emulation apparatus claimed in claim 1, wherein said return state memory means comprises:
    a return state storing program memory for storing the first programs which are used to make said microprocessor means read or write said value registered in said register included in said microprocessor means when execution of said program included in said system under measurement is stopped, and the second programs which are used to make said microprocessor means rewrite said value registered in said register when said program included in said system under measurement is reexecuted;
    a return state storing memory for storing said value registered which is read by execution of said first programs; and
    an address decoder for delivering enable signals which enable said return state storing program memory and said return state storing memory to be read or written by being controlled with outputs from said bus exchange means, when said return state storing program memory and said return state storing memory are accessed.

5. A microprocessor emulation apparatus claimed in claim 1, wherein said control program means comprises:
    a control program memory for storing control programs which are used for reading and rewriting contents of registers and memories included in said microprocessor means and said system under measurement;
    a control data memory for storing said contents which are read by execution of said control programs; and
    an address decoder for delivering enable signals to said control program memory and said control data memory to be accessed by said microprocessor means.

6. A microprocessor emulation apparatus claimed in claim 1, wherein said idle program means comprises:
    an idle program memory for storing said pseudo stopping program; and
    an address decoder for referring to a predetermined address to read said pseudo stopping program from said idle program memory.

7. A microprocessor emulation apparatus claimed in claim 1, wherein said bus exchange means comprises:
    a halt signal generator for generating a halt signal to indicate said pseudo stopping state by being added said start signal or said stop signal thereto;

a jump command period detector for detecting a period for which, receiving said halt signal, said microprocessor means is forced to read a conditional jump instruction;

a microprocessor state detector for detecting a period for which a state of said microprocessor means are returned to a previous state in which said microprocessor means was added said stop signal by execution of a program stored in said return state memory means;

a jump execution detector for detecting that said conditional jump instruction forcedly read in executed by said microprocessor;

an address counter for counting a period for which said microprocessor is forced to read said conditional jump instruction and for delivering an address of said conditional jump instruction;

a jump instruction memory for storing conditional jump instructions and long jump instructions which are used for starting or stopping execution of programs included in said system under measurement and said control program means and can be read by indication of said address delivered from said address counter; and a switch driver which delivers latch and read signals to said return address memory means, write and read signals to said return state memory means, and control signals to said switch means by receiving said halt signal, an output of said microprocessor state detector, an output of said jump execution detector, a store enable signal delivered from said microprocessor means and said command signal.

* * * * *